US012571903B2

(12) United States Patent
Kang et al.

(10) Patent No.: US 12,571,903 B2
(45) Date of Patent: Mar. 10, 2026

(54) ELECTRONIC DEVICE FOR TRANSMITTING DATA THROUGH UWB COMMUNICATION, AND ELECTRONIC DEVICE OPERATING METHOD

(71) Applicant: Samsung Electronics Co., Ltd., Suwon-si (KR)

(72) Inventors: Moonseok Kang, Suwon-si (KR); Yi Yang, Suwon-si (KR); Guangyu Sun, Suwon-si (KR); Qianshao Zhang, Suwon-si (KR); Hyunchul Kim, Suwon-si (KR); Jonghoon Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 18/456,204

(22) Filed: Aug. 25, 2023

(65) Prior Publication Data
US 2023/0400568 A1 Dec. 14, 2023

Related U.S. Application Data

(63) Continuation of application No. PCT/KR2022/000083, filed on Jan. 4, 2022.

(30) Foreign Application Priority Data

Mar. 23, 2021 (KR) ........................ 10-2021-0037577

(51) Int. Cl.
*G01S 13/76* (2006.01)
*G01S 13/87* (2006.01)

(52) U.S. Cl.
CPC .......... *G01S 13/765* (2013.01); *G01S 13/878* (2013.01)

(58) Field of Classification Search
CPC ............................. G01S 13/765; G01S 13/878
(Continued)

(56) References Cited

U.S. PATENT DOCUMENTS 9,571,974 B2 * 2/2017 Choi ........................ H04W 4/80
10,159,044 B2 * 12/2018 Hrabak ............. H04W 52/0245
(Continued)

FOREIGN PATENT DOCUMENTS

CN 208102016 U 11/2018
CN 208589147 U 3/2019
(Continued)

OTHER PUBLICATIONS

International Search Report for PCT/KR2022/000083 mailed Mar. 31, 2022, 4 pages.
(Continued)

*Primary Examiner* — Nuzhat Pervin
(74) *Attorney, Agent, or Firm* — Nixon & Vanderhye P.C.

(57) ABSTRACT

An electronic device may include: a first communication circuit for transmitting or receiving data through first communication by using an ultra wide band (UWB); a second communication circuit for transmitting or receiving data through second communication, which differs from the first communication; and a processor, wherein the processor may be configured to: receive, from a first external electronic device and a second external electronic device, through the second communication circuit, an advertising message for requesting position measurement of the electronic device; activate the first communication circuit in response to the advertising message satisfying a designated condition; receive, from the first external electronic device, a first polling message for the position measurement of the electronic device; check whether to receive, from the second external electronic device, a second polling message for the
(Continued)

position measurement of the electronic device for a time designated from the reception time of the first polling message; and broadcast, in response to the reception of the second polling message, a first response message including information for measurement of the distance between the electronic device and the first external electronic device and information for measurement of the distance between the electronic device and the second external electronic device. Various other embodiments are possible.

15 Claims, 14 Drawing Sheets

(58) Field of Classification Search
USPC .......................................................... 342/125
See application file for complete search history.

(56) References Cited

U.S. PATENT DOCUMENTS

| | | | | |
|---|---|---|---|---|
| 10,756,418 | B2* | 8/2020 | Ghabra .............. | G07C 9/00309 |
| 2010/0063889 | A1* | 3/2010 | Proctor, Jr. ........ | G06Q 30/0261 |
| | | | | 705/26.1 |
| 2015/0035685 | A1* | 2/2015 | Strickland .............. | B60Q 9/008 |
| | | | | 340/901 |
| 2016/0094935 | A1* | 3/2016 | Cedo Perpinya ....... | H04L 67/34 |
| | | | | 455/41.2 |
| 2016/0182548 | A1* | 6/2016 | Ghabra ................. | H04W 24/10 |
| | | | | 726/23 |
| 2018/0156624 | A1* | 6/2018 | Bai ....................... | G08G 1/0112 |
| 2018/0279103 | A1* | 9/2018 | Hong .................... | H04W 76/19 |
| 2019/0069266 | A1* | 2/2019 | Han ..................... | H04W 64/003 |
| 2019/0208387 | A1* | 7/2019 | Jiang ....................... | H04W 4/46 |
| 2020/0029245 | A1* | 1/2020 | Khoryaev ............. | H04W 36/22 |
| 2020/0106877 | A1* | 4/2020 | Ledvina ................ | H04W 12/06 |
| 2020/0164834 | A1* | 5/2020 | Qiao ....................... | B60R 22/48 |
| 2020/0182996 | A1* | 6/2020 | Lee ........................ | G01S 13/785 |
| 2020/0304970 | A1 | 9/2020 | Jiang et al. | |
| 2020/0389763 | A1 | 12/2020 | Yoon et al. | |
| 2021/0026347 | A1* | 1/2021 | Nakashima .......... | G05D 1/0016 |
| 2021/0072373 | A1* | 3/2021 | Schoenberg .......... | G01S 13/878 |
| 2021/0076163 | A1* | 3/2021 | Burowski .............. | H04W 4/08 |
| 2022/0007333 | A1 | 1/2022 | Lee et al. | |

FOREIGN PATENT DOCUMENTS

| | | |
|---|---|---|
| KR | 20180135947 A | 12/2018 |
| KR | 20200070054 A | 6/2020 |
| KR | 20200131292 A | 11/2020 |
| WO | 2017196584 A1 | 11/2017 |
| WO | 2019218156 A1 | 11/2019 |

OTHER PUBLICATIONS

Korean Notice of Allowance dated Oct. 1, 2025 for KR Application No. 10-2021-0037577.

* cited by examiner

FIG. 1

ELECTRONIC DEVICE FOR TRANSMITTING DATA THROUGH UWB COMMUNICATION, AND ELECTRONIC DEVICE OPERATING METHOD

CROSS-REFERENCE TO RELATED APPLICATIONS

This application is a continuation of International Application No. PCT/KR2022/000083 filed on Jan. 4, 2022, designating the United States, in the Korean Intellectual Property Receiving Office, and claiming priority to KR Patent Application No. 10-2021-0037577 filed on Mar. 23, 2021, in the Korean Intellectual Property Office, the disclosures of all of which are hereby incorporated by reference herein in their entireties.

BACKGROUND

Field

Various example embodiments relate to an electronic device and/or a method of operating the electronic device, and for example, to a technology for determining a position of an electronic device through, for example, a UWB communication method.

Description of Related Art

Various electronic devices such as a smart phone, tablet personal computer (PC), portable multimedia player (PMP), personal digital assistant (PDA), laptop PC, and/or wearable device are becoming widespread.

A technology using electronic devices supporting an ultra wideband (UWB) is being researched. For example, a technology for measuring positions of electronic devices through UWB communication between the electronic devices and providing various services (e.g., authentication services) through the measured positions is being researched. Ultra wideband communication may use a larger bandwidth than that of other communication methods, and position measurement using ultra-wideband communication may have a smaller error than that of position measurement using a grobal positioning system (GPS).

SUMMARY

Position measurement of an electronic device may be performed by an external electronic device. The electronic device may receive a polling message transmitted by an external electronic device and transmit a response message including information for position measurement thereof. Information for position measurement of the electronic device included in the response message may include a difference between a reception time of the polling message and a transmission time of the response message.

In the case that the number of external electronic devices for measuring a position of the electronic device increases, the number of response messages transmitting to the external electronic device may increase. As the number of response messages increases, power consumed in transmitting the response message may increase. Furthermore, in the case that the number of response messages to be transmitted increases, interference of a signal including each of the response messages may increase; thus, a quality of a signal of the response message may be degraded.

An electronic device and/or a method of operating the electronic device according to various example embodiments may transmit a response message including information for position measurement between each external electronic device and the electronic device based on a reception time of a polling message, thereby relatively reducing power consumption.

According to various example embodiments, an electronic device may include a first communication circuit configured to perform data transmission or reception through first communication using an ultra wide band (UWB); a second communication circuit configured to perform data transmission or reception through second communication different from first communication; and a processor, wherein the processor may be configured to receive an advertising message requesting position measurement of the electronic device from a first external electronic device and a second external electronic device through the second communication circuit, to activate the first communication circuit corresponding to the advertising message satisfying a designated condition, to receive a first polling message for position measurement of the electronic device from the first external electronic device, to identify whether a second polling message for position measurement of the electronic device is received from the second external electronic device during a designated time from a reception time of the first polling message, and to broadcast a first response message including information for measuring a distance between the electronic device and the first external electronic device and information for measuring a distance between the electronic device and the second external electronic device corresponding to reception of the second polling message.

According to various example embodiments, an electronic device may include a first communication circuit configured to transmit or receive data through first communication using an ultra wide band (UWB); a second communication circuit configured to perform data transmission or reception through second communication different from first communication; and a processor, wherein the processor may be configured to broadcast an advertising message requesting position measurement of an external electronic device through the second communication, to activate the first communication circuit corresponding to a response message corresponding to the advertising message from the external electronic device, to control the first communication circuit to transmit a polling message for measuring the position of the external electronic device, to identify a relative position between the external electronic device and the electronic device based on a response message received through the second communication circuit, and to transmit a polling message including a request message requesting the external electronic device to output a notification corresponding to the relative position between the external electronic device and the electronic device satisfying a specified condition.

According to various example embodiments, a method of operating an electronic device may include receiving an advertising message requesting position measurement of the electronic device from a first external electronic device and a second external electronic device; activating a first communication circuit configured to perform first communication corresponding to the advertising message satisfying a designated condition; receiving a first polling message for position measurement of the electronic device from the first external electronic device; identifying whether a second polling message for position measurement of the electronic device is received from the second external electronic device during a designated time period from a reception time of the first polling message; and broadcasting a first response message including information for measuring a distance between the electronic device and the first external electronic device and information for measuring a distance between the electronic device and the second external electronic device corresponding to reception of the second polling message.

An electronic device and/or a method of operating the electronic device according to various example embodiments can identify whether a polling message is received from another external electronic device (e.g., second external electronic device) during a designated time period after receiving a polling message from a first external electronic device. The electronic device may transmit one response message to external electronic devices that have transmitted the received polling message corresponding to receiving a polling message from another external electronic device within a designated time period. Accordingly, the electronic device and/or a method of operating the electronic device may reduce power to be consumed in transmitting a response message.

BRIEF DESCRIPTION OF DRAWINGS

In connection with the description of the drawings, the same or similar reference numerals may be used for the same or similar elements. Other aspects, features and advantages according to specific example embodiments will become more apparent from the accompanying drawings and corresponding descriptions in association.

FIG. 1 is a block diagram illustrating an electronic device according to various example embodiments.

DETAILED DESCRIPTION

Figure 1:
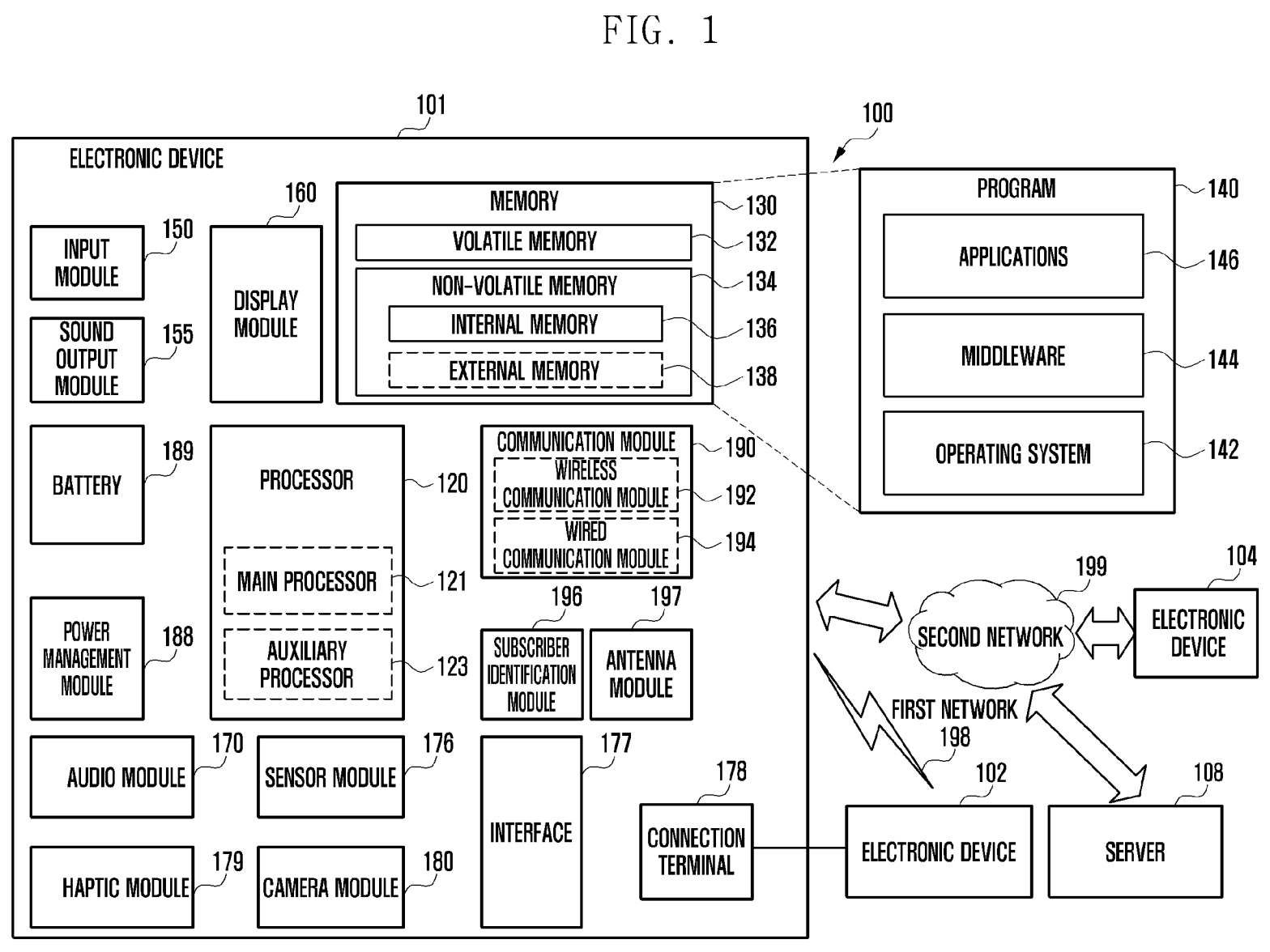
Figure 2A:
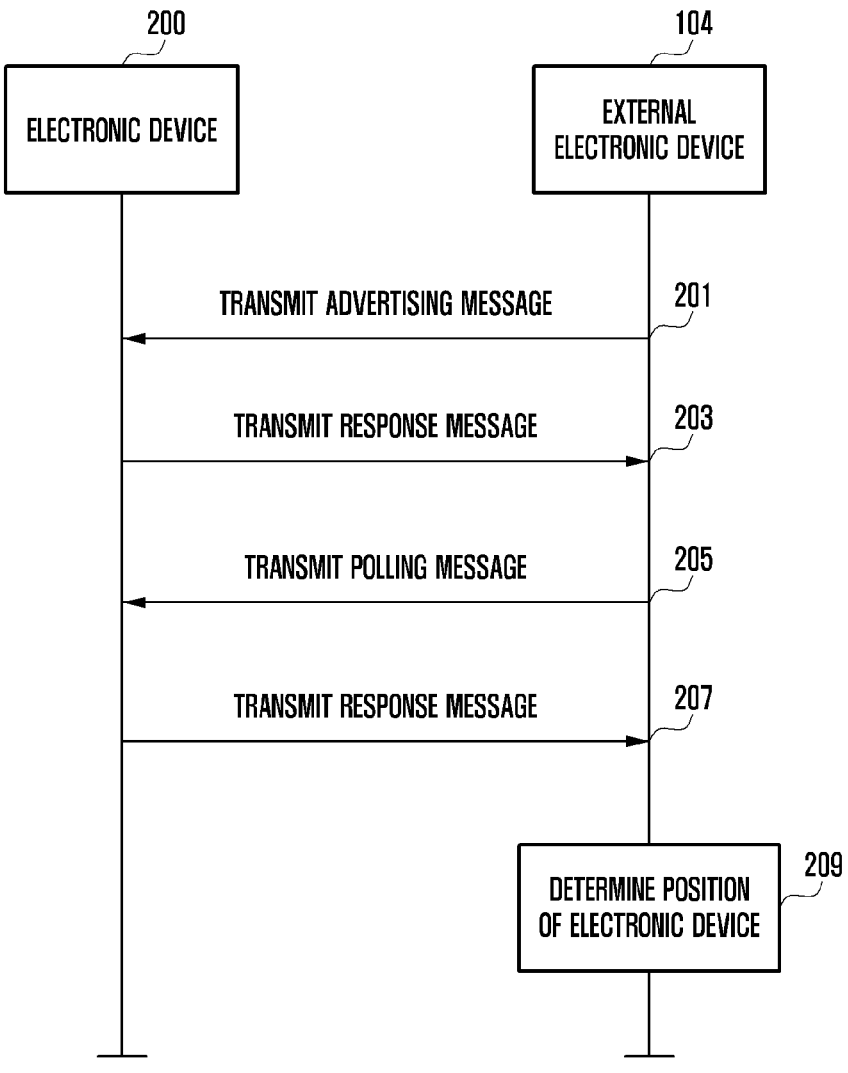
FIG. 2A is a message flow diagram illustrating an embodiment of determining a position of an electronic device according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at ne of are electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 1'70, a sensor module 176, an interface 177, a connecting/connection terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (CPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application(s) 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound Output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (MMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GLASS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URILLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas), in such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GHQ), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2A is a message flow diagram illustrating an embodiment of determining a position of an electronic device according to various example embodiments.

FIG. 2A illustrates an embodiment in which an external electronic device (e.g., the electronic device 104 of FIG. 1) determines a position of an electronic device 200 based on messages exchanged between the electronic device (e.g., the electronic device 101 of FIG. 1) 200 and the external electronic device 104 according to various example embodiments.

According to various example embodiments, the electronic device 200 and the external electronic device 104 may support various communication methods, According to an embodiment, the electronic device 200 and the external electronic device 104 may exchange data through first communication. The first communication may include, for example, ultra wideband (hereinafter, UWB) communication. The UWB may indicate various communication methods of transmitting information using a wider frequency band (e.g., a frequency band of 3.1 GHz to 10 GHz hand) than that of other communication According to various example embodiments, the electronic device 200 and the external electronic device 104 may exchange data through second communication different from first communication. The second communication is various communication methods supporting device-to-device (D2D) communication, and the second communication may be, for example, a short-distance wireless communication method (e.g., Bluetooth, BLE, or Wi-Fi).

According to various example embodiments, in operation 201, the external electronic device 104 may transmit (or broadcast) to at least the electronic device 200 an advertising message through second communication. The advertising message may include, for example, information required to perform data exchange through first communication (e.g., information indicating whether the external electronic device 104 supports first communication, information indicating whether the external electronic device 104 has activated first communication, and identification information of the external electronic device 104).

According to various example embodiments, the external electronic device 104 may transmit an advertising message corresponding to information collected by the external electronic device 104 satisfying a designated condition. According to an embodiment, in the case that the external electronic device 104 is a means of transportation, the external electronic device 104 may transmit an advertising message in the case that collected information satisfies a designated condition based on driving information and/or information collected through various sensors cameras).

According to various example embodiments, the electronic device 200 may receive an advertising message transmitted by the external electronic device 104, and in operation 203, the electronic device 200 may transmit a response message (e.g., BLE SCAN response message) to the advertising message to the external electronic device 104.

According to various example embodiments, the electronic device 200 may transmit a response message to the external electronic device 104 through second communication corresponding to the advertising message satisfying a designated condition. The electronic device 200 may transmit a response message to the external electronic device 104 corresponding to a quality (e.g., RSRP and/or RSSI) of a signal including the advertising message satisfying a designated condition (e.g., a condition in which the signal quality is greater than or equal to a designated value). The response message may include information required to perform data exchange through first communication (e.g., information indicating whether the electronic device 200 supports first communication, information indicating whether the electronic device 200 has activated first communication, and identification information of the electronic device 200).

According to various example embodiments, the external electronic device 104 may activate first communication corresponding receiving the response message. The external electronic device 104 may perform ranging (e.g., two-way ranging) for determining a position of the electronic device 200 while transmitting and receiving various messages through first communication.

According to various example embodiments, in operation 205, the external electronic device 104 may transmit a polling message to the electronic device 200. The polling message may be a message indicating the start of ranging. The external electronic device 104 may store time information $T_1$ at which the polling message was transmitted while transmitting the polling message.

According to various example embodiments, in operation 207, the electronic device 200 may transmit a response message according to reception of the polling message to the external electronic device 104. The response message may include information for measuring a distance between the electronic device 200 and the external electronic device 104. According to an embodiment, the response message may include a difference value (e.g., reply time) between a time (e.g., $T_2$) at which the electronic device 200 receives the polling message and/or a time (e.g., $T_3$) at which the electronic device 200 transmits the response message. According to another embodiment, the response message may include time information at which the electronic device 200 receives the polling message and/or time information at which the electronic device 200 transmits the response message.

According to various example embodiments, in operation 209, the external electronic device 104 may determine a position of the electronic device 200. The external electronic device 104 may determine a position of the electronic device 200 based on a time (e.g., $T_4$) at which the response message is received, a time (e.g., $T_1$) at which the polling message is transmitted, and a reply time included in the response message. The external electronic device 104 may determine a position of the electronic device 200 using Equation 1.

$$\text{Distance} = \frac{(T_4 - T_1) - (T_3 - T_2)}{2} * c, \qquad \text{[Equation 1]}$$

$$c = 3 * 10^8 \text{ m/s (speed of first signal)}$$

Figure 2B:
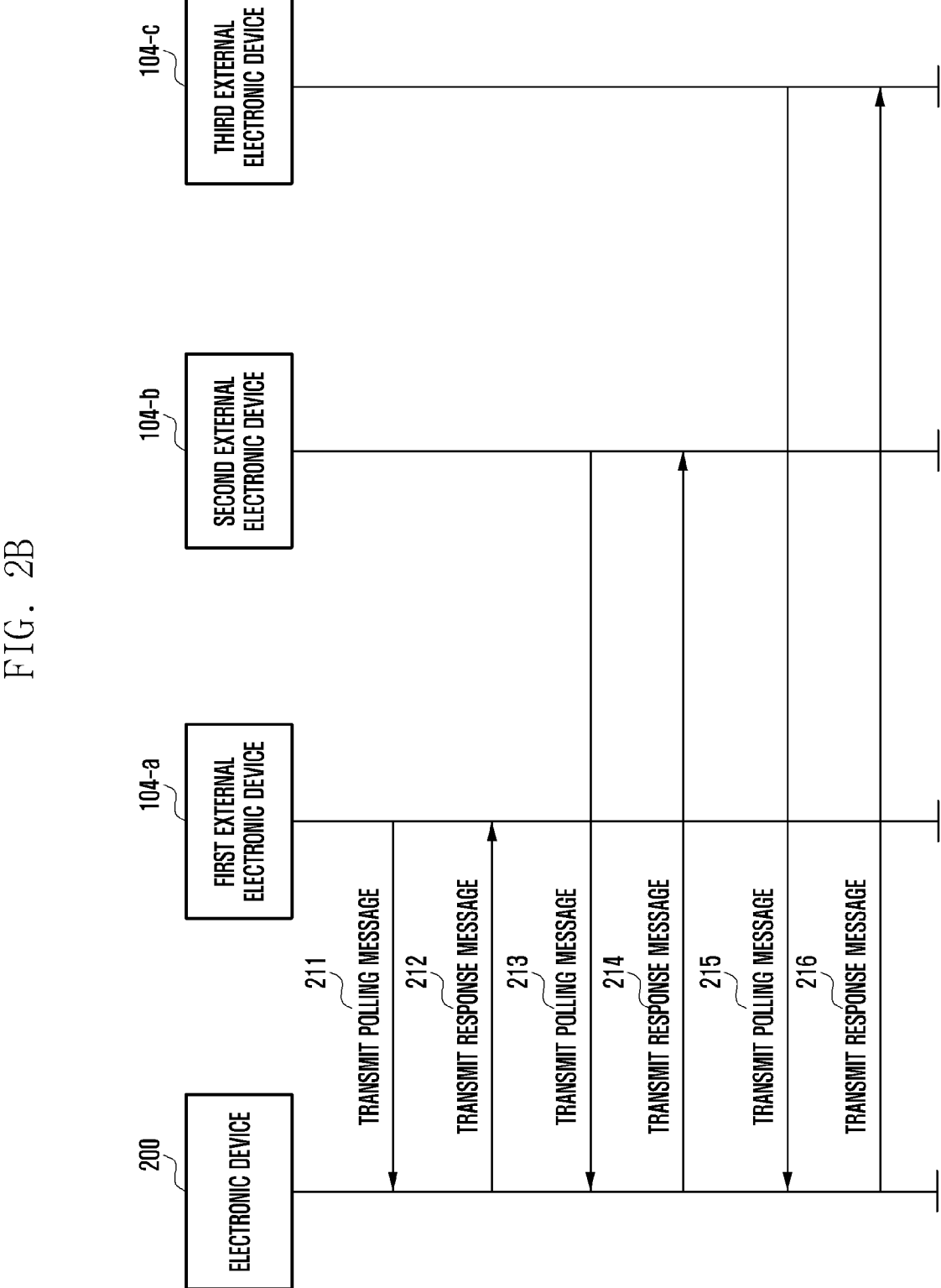
FIG. 2B is a message flow diagram illustrating an embodiment in which a first external electronic device, a second external electronic device, and/or a third external electronic device determine(s) a position of an electronic device according to various example embodiments.

FIG. 2B is a message flow diagram illustrating an embodiment in which a first external electronic device, a second external electronic device, and/or a third external electronic device determine(s) a position of an electronic device according to various example embodiments.

According to various example embodiments, the electronic device 200 may transmit a message (e.g., response message) including information for measuring a position of the electronic device 200 to a plurality of external electronic devices (e.g., a first external electronic device 104-a, a second external electronic device 104-b, and/or a third external electronic device 104-c).

According to various example embodiments, in operation 211, the first external electronic device 104-a may transmit a polling message to the electronic device 200. The polling message may be a message indicating the start of ranging. While transmitting the polling message, the first external electronic device 104-a may store information on a time at which the polling message was transmitted.

According to various example embodiments, in operation 212, the electronic device 200 may transmit a response message according to reception of the polling message to the first external electronic device 104-a. The response message may include information for measuring a distance between the electronic device 200 and the first external electronic device 104-a. According to an embodiment, the response message may include a difference value (e.g., reply time) between a time (e.g., $T_2$) at which the electronic device 200 receives the polling message and/or a time (e.g., $T_3$) at which the response message is transmitted.

According to various example embodiments, operation 213, the second external electronic device 104-b may transmit a polling message to the electronic device 200, The polling message may be a message indicating the start of ranging. While transmitting the polling message, the second external electronic device 104-b may store information on a time at which the polling message was transmitted.

According to various example embodiments, in operation 214, the electronic device 200 may transmit a response message according to reception of the polling message to the second external electronic device 104-b. The response message may include information for measuring a distance between the electronic device 200 and the second external electronic device 104-b. According to an embodiment, the response message may include a difference value (e.g., reply time) between a time at which the electronic device 200 receives the polling message d/or a time at which the response message was transmitted.

According to various example embodiments, in operation 215, the third external electronic device 104-c may transmit a polling message to the electronic device 200. The polling age may be a message indicating the start of ranging. While transmitting the polling message, the third external electronic device 104-c may store information on a time at which the polling message is transmitted.

According to various example embodiments, in operation 216, the electronic device 200 may transmit a response message according to reception of the polling message to the third external electronic device 104-c. The response message may include information for measuring a distance between the electronic device 200 and the third external electronic device 104-c. According to an embodiment, the response message may include a difference value (e.g., reply time) between a time at which the electronic device 200 receives the polling message and/or a time at which the response message is transmitted.

With reference to the embodiment illustrated in FIG. 2B, the electronic device 200 may transmit a response message to all external electronic devices that have transmitted a polling message. In the case that the number of external electronic devices increases, the electronic device 200 should transmit more response messages, and in this case, power consumption of the electronic device 200 according to transmission of the response messages may increase.

Hereinafter, the electronic device 200 capable of reducing power consumption according to transmission of a response message will be described.

Figure 3:
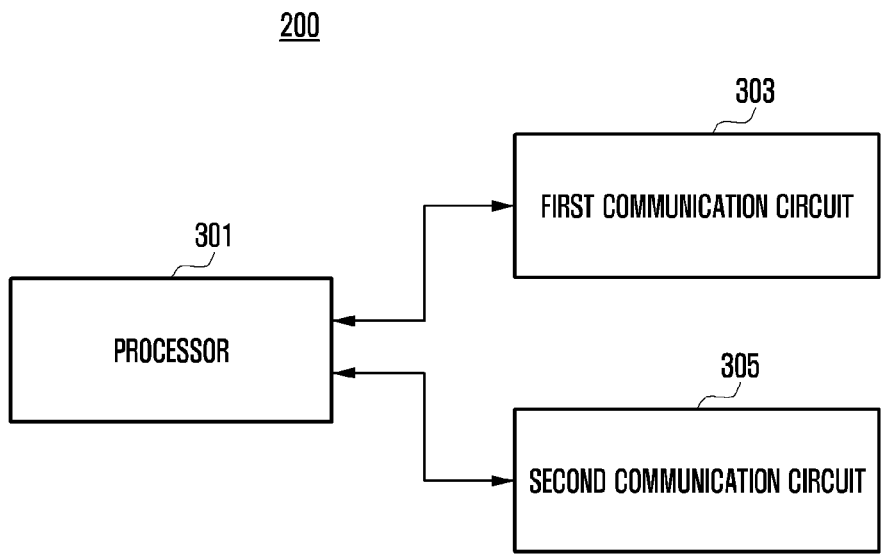
FIG. 3 is a block diagram illustrating an electronic device according to various example embodiments.
Figure 4:
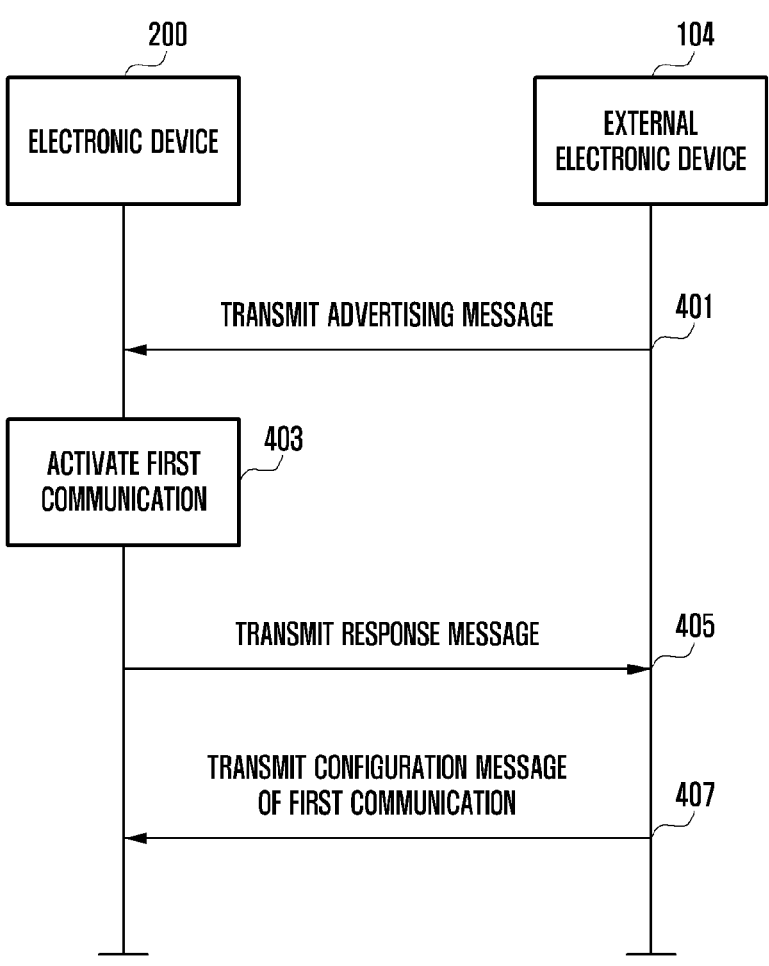
FIG. 4 is a message flow diagram illustrating an embodiment in which an electronic device activates first communication in order to measure a position thereof according to various example embodiments.

FIG. 3 is a block diagram illustrating an electronic device according to various example embodiments.

The electronic device the electronic device 200 of FIG. 2) according to various example embodiments may include a processor 301 (e.g., the processor 120 of FIG. 1), a first communication circuit 303 (e.g., the communication module 190 of FIG. 1), and/or a second communication circuit 305 (e.g., the communication module 190 of FIG. 1).

According to various example embodiments, the first communication circuit 303 may be electrically connected to the processor 301 and transfer a signal through first communication and received through an antenna (not illustrated) to the processor 301. The first communication circuit 303 may be electrically connected to the antenna and transmit a signal including data to be transmitted through first communication to the antenna. The first communication may include, for example, ultra wideband (hereinafter, UWB) communication. The UWB may indicate various communication methods of transmitting it formation using a wider frequency band (e.g., a frequency band of 3.1 GHz to 10 GHz band) than that of other communication methods.

According to various example embodiments, the second communication circuit 305 may be electrically connected, directly or indirectly, to the processor 301, receive a signal through second communication, and transfer the signal to the processor 301. The second communication circuit 305 may be electrically connected, directly or indirectly, to the antenna and transmit a signal including data to be transmitted through second communication to the antenna. The second communication is various communication methods supporting device-to-device (D2D) communication, and the second communication may be, for example, a short-distance wireless communication method (e.g., Bluetooth, BLE, or Wi-Fi).

According to various example embodiments, the processor 301 may include at east one processor of a communication processor (e.g., the auxiliary processor 123 of FIG. 1) or an application processor (e.g., the main processor 121 of FIG. 1). The processor 301 may control the first communication circuit 303 to transmit or receive data through first communication with an external electronic device (e.g., the first external electronic device 104-a, the second external electronic device 104-b, and/or the third external electronic device 104-c of FIG. 2B) for determining a position of the electronic device 200.

According to various example embodiments, the processor 301 may receive an advertising message transmitted by the first external electronic device 104-a. The advertising message may be a message requesting position measurement of the electronic device 200. The advertising message may include information (e.g., information indicating whether the first external electronic device 104-a supports first communication, information indicating whether the first external electronic device 104-a has activated first communication, or identification information of the first external electronic device 104-a) required to perform data exchange through first communication.

According to various example embodiments, the advertising message may be transmitted to the electronic device 200 through first communication or another communication method (out of band (OOB)) (e.g., second communication). According to an embodiment, the advertising message may be received through second communication, and the processor 301 may receive the advertising message received by the second communication circuit 305.

According to various example embodiments, the processor 301 may receive an advertising message from the second external electronic device 104-b. The advertising message may be a message requesting position measurement of the electronic device 200. The advertising message may include information (e.g., information indicating whether the second external electronic device 104-b supports first communication, information indicating whether the second external electronic device 104-b has activated first communication, or identification information of the second external electronic device 104-b) required to perform data exchange through first communication.

According to various example embodiments, the processor 301 may receive an advertising message and activate the first communication circuit 303 corresponding to the advertising message satisfying a designated condition. The processor 301 may activate the first communication circuit 303 corresponding to a quality (e.g., RSRP and/or RSSI) of a signal including the advertising message satisfying a designated condition (e.g., a condition in which the signal quality is equal to or greater than a designated value).

According to various example embodiments, the processor 301 may control the second communication circuit 305 to activate the first communication circuit 303 and to transmit a response message to the first external electronic device 104-a through second communication.

According to various example embodiments, the response message may include information required to perform data exchange through first communication (e.g., information indicating whether the electronic device 200 supports first communication, information indicating whether the electronic device 200 has activated first communication, and identification information of the electronic device 200).

According to various example embodiments, the processor 301 may establish a connection with the first external electronic device 104-*a* and/or the second external electronic device 104-*b* through first communication. During an establishment operation, the processor 301 may exchange an UWB parameter for UWB communication connection with the first external electronic device 104-*a* and/or the second external electronic device 104-*b*. The UWB parameter may be included in a response message transmitted through the second communication circuit 305 or may be included in a control message transmitted through first communication. According to an embodiment, the UWB parameter may be included in an advertising message or a response message (BLE scan response message) to the advertising message. The UWB parameter included in the advertising message may include at least one of information indicating whether the first external electronic device 104-*a* and/or the second external electronic device 104-*b* supports first communication (e.g., UWB), information indicating whether the first communication has activated, information on a channel for performing first communication, or a media access control (MAC) address for first communication. The UWB parameter included in the response message may include at least one of information indicating whether the electronic device 200 supports first communication (e.g., UWB), information indicating whether first communication has activated, information on a channel for performing first communication, or a media access control (MAC) address for first communication.

According to various example embodiments, the processor 301 may control the first communication circuit 303 such that the first external electronic device 104-*a* and the electronic device 200 are connected, directly or indirectly, through first communication and that the second external electronic device 104-*b* and the electronic device 200 are connected, directly or indirectly, through first communication.

According to various example embodiments, while the first external electronic device. 104-*a* and/or the second external electronic device 104-*b* transmit(s) and receive(s) various messages through first communication, the first external electronic device 104-*a* and/or the second external electronic device 104-*b* may individually perform ranging (e.g., two-way ranging) for determining a position of the electronic device 200.

According to various example embodiments, the processor 301 may receive a first polling message from the first external electronic device 104-*a*. The first polling message may be a message indicating the start of ranging. The first external electronic device 104-*a* may store information on a time at which the first polling message was transmitted while transmitting the first polling message. According to an embodiment, the first polling message may include information on a transmission time of the first polling message.

According to various example embodiments, the processor 301 may maintain activation of a receiving function of the first communication circuit 303 during a designated time period after receiving the first polling message from the first external electronic device 104-*a*. The receiving function of the first communication circuit 303 may indicate a receiving function of a received signal through first communication. For example, the designated time may be configured to various values by the manufacturer of the electronic device

200. For example, the designated time may be 50 ms, which is half of a ranging period (e.g., 100 ms).

According to various example embodiments, the processor 301 may identify whether the second polling message is received from the second external electronic device 104-*b* during a designated time period. The second polling message may be a message indicating the start of ranging. The second external electronic device 104-*b* may store information on a time at which the second polling message was transmitted while transmitting the second polling message.

The processor 301 may broadcast (or multi-cast) a first response message including information (e.g., reply time) for measuring a distance between the electronic device 200 and the first external electronic device 104-*a* and information (e.g., reply time) for measuring a distance between the electronic device 200 and the second external electronic device 104-*b* through the first communication circuit 303 corresponding to receiving the second polling message within a designated time period (e.g., 67 ms) after receiving the first polling message.

According to an embodiment, the first response message may include a difference (e.g., reply time) between a reception time of a first polling message transmitted by the first external electronic device 104-*a* and a transmission time of the first response message and/or a difference (e.g., reply time) between a reception time of a second polling message transmitted by the second external electronic device 104-*b* and a transmission time of the first response message. The first response message may be implemented, as illustrated in Table 1.

TABLE 1

| Parameter | Size (bits) | Description |
|---|---|---|
| Vendor OUI | 24 | Manufacturer identification information of the electronic device 200 |
| UWB Message ID | 4 | Identification information of the first response message |
| Replay time list | 48*N | Data N that an external electronic device may use for determining a position of the electronic device 200: the number of external electronic devices capable of receiving the first response message |

According to various example embodiments, a reply time list included in the first response message may be implemented, as illustrated in Table 2.

TABLE 2

| Parameter | Size (bits) | Description |
|---|---|---|
| Address | 16 | Address information of the external electronic devices 104-a and 104-b |
| Replay time | 32 | Difference between a reception time of the first polling message (or the second polling message) and a transmission time of the first response message |

According to various example embodiments, the processor 301 may transmit one first response message without transmitting each of a second response message corresponding to the first polling message and a third response message corresponding to the second polling message, thereby reducing the number of transmissions of response messages. Through the above method, the electronic device 200 can reduce power consumption according to transmission of the response message.

According to various example embodiments, the processor 301 may broadcast (or multicast) a first response message including information (e.g., reply time) for measuring a distance between the electronic device 200 and the first external electronic device 104-*a* and information (e.g., reply time) for measuring a distance between the electronic device 200 and the second external electronic device 104-*b* corresponding to receiving the second polling message within a designated time period after receiving the first polling message.

According to various example embodiments, the first external electronic device 104-*a* may receive the first response message and determine a relative position of the electronic device 200 to the first external electronic device 104-*a* based on a reply time corresponding to the first external electronic device 104-*a* included in a reply time list in the first response message, and a transmission time of the first polling message.

According to various example embodiments, the second external electronic device 104-*b* may receive the first response message, and determine a relative position of the electronic device 200 to the second external electronic device 104-*b* based on a reply time corresponding to the second external electronic device 104-*b* included in a reply time list in the first response message and a transmission time of the second polling message.

According to various example embodiments, the processor 301 may transmit a second response message including information (e.g., reply time) for measuring a distance between the electronic device 200 and the first external electronic device 104-*a* to the first external electronic device 104-*a* corresponding to not receiving the second polling message within a designated time period after receiving the first polling message. The second response message may include a difference (e.g., reply time) between a reception time of the first polling message transmitted by the first external electronic device 104-*a* and a transmission time of the second response message.

According to various example embodiments, the processor 301 may maintain a receiving function of the first communication circuit 303 in an activated state until the second polling message is received. The processor 301 may transmit a third response message including information (e.g., reply time) for measuring a distance between the electronic device 200 and the second external electronic device 104-*b* to the second external electronic device 104-*b* corresponding to receiving the second polling message after a designated time period. The third response message may include a difference (e.g., reply time) between a reception time of the second polling message transmitted by the second external electronic device 104-*b* and a transmission time of the third response message.

According to various example embodiments, the processor 301 may temporarily deactivate a receiving function of the first communication circuit 303 after transmitting the first response message. The processor 301 may activate a receiving function of the first communication circuit 303 based on an earlier time of a reception time of the first polling message and a reception time of the second polling message. For example, the processor 301 may activate a receiving function of the first communication circuit 303 at a time obtained by adding a reception time of the first polling message and a ranging period. The processor 301 may activate the receiving function of the first communication circuit 303 and stand by reception of the first polling message and the second polling message every ranging period.

According to various example embodiments, the first polling message may include a transmission time of the first polling message, and the second polling message may include a transmission time of the second polling message. The processor 301 may control a receiving function of the first communication circuit 303 based on a transmission time of the first polling message and a transmission time of the second polling message. According to an embodiment, the processor 301 may activate a receiving function of the first communication circuit 303 based on an earlier time of the transmission time of the first polling message and the transmission time of the second polling message. For example, the processor 301 may activate a receiving function of the first communication circuit 303 at a time obtained by adding the transmission time of the first polling message and the ranging period. The processor 301 may activate the receiving function of the first communication circuit 303 and stand by reception of the first polling message and the second polling message every ranging period.

According to various example embodiments e processor 301 may receive an advertising message for position measurement of the electronic device 200 from the third external electronic device 104-*c* while performing a ranging operation with the first external electronic device 104-*a* and/or the second external electronic device 104-*b*. The processor 301 may control the first communication circuit 303 to connect the third external electronic device 104-*c* to the electronic device 200 through first communication corresponding to the advertising message satisfying a designated condition.

According to various example embodiments, while the first external electronic device 104-*c*, the second external electronic device 104-*b*, and/or the third external electronic device 104-*c* transmit(s) and receive(s) various messages to and from each other through first communication, the first external electronic device 104-*a*, the second external electronic device 104-*b*, and/or the third external electronic device 104-*c* may individually perform ranging (e.g., two-way ranging) for determining a position of the electronic device 200.

According to various example embodiments, the processor 301 may receive a third polling message from the third external electronic device 104-*c*. The third polling message may be a message indicating the start of ranging. While transmitting the third polling message, the third external electronic device 104-*c* may store information on a time at which the third polling message was transmitted.

According to various example embodiments, the processor 301 may maintain a receiving function of the first communication circuit 303 until the third polling message is received corresponding to receiving an advertising message for the first time from the third external electronic device 104-*c*.

According to various example embodiments, the processor 301 may temporarily stop transmission of a response message to be transmitted to the first external electronic device 104-*a* and the second external electronic device 104-*b* until the third polling message is received.

According to various example embodiments, the processor 301 may broadcast (or multicast) a first response message including information (e.g., reply time) for measuring a distance between the electronic device 200 and the first external electronic device 104-*a*, information (e.g., reply time) for measuring a distance between the electronic device 200 and the second external electronic device 104-*b*, and/or information (e.g., reply time) for measuring a distance between the electronic device 200 and the third external electronic device 104-*c* corresponding to receiving the third polling message.

According to an embodiment, the first response message may include a difference (e.g., reply time) between a reception time of the first polling message transmitted by the first external electronic device 104-*a* and a transmission time of the first response message, a difference (e.g., reply time) between a reception time of a second polling message transmitted by the second external electronic device 104-*b* and a transmission time of the first response message, and/or a difference (e.g., reply time) between a reception time of a third polling message transmitted by the third external electronic device 104-*c* and a transmission time of the first response message.

According to various example embodiments, the processor 301 may identify whether a third polling message is received within a designated time period after receiving the first polling message and/or the second polling message.

The processor 301 may broadcast (or multicast) a first response message including information (e.g., reply time) for measuring a distance between the electronic device 200 and the first external electronic device 104-*a*, information (e.g., reply time) for measuring a distance between the electronic device 200 and the second external electronic device 104-*b*, and/or information (e.g., reply time) for measuring a distance between the electronic device 200 and the third external electronic device 104-*c* corresponding to receiving the third polling message within a designated time period.

The processor 301 may broadcast multicast) a first response message including information (e.g., reply time) for measuring a distance between the electronic device 200 and the first external electronic device 104-*a* and information (e.g., reply time) for measuring a distance between the electronic device 200 and the second external electronic device 104-*b* corresponding to not receiving the third polling message within a designated time period.

According to various example embodiments, the processor 301 may transmit a fourth response message including information (e.g., reply time) for measuring a distance between the electronic device 200 and the third external electronic device 104-*c* to the third external electronic device 104-*c* corresponding to receiving the third polling message after designated time period.

Through the above embodiment, the electronic device 200 may transmit one response message to the external electronic device that has transmitted the received polling message corresponding to receiving the polling message within a designated time period. Accordingly, the electronic device 200 can reduce power consumption due to transmission of the response message.

Fla 4 is a message flow diagram illustrating an embodiment in which an electronic device activates first communication in order to measure a position thereof according to various example embodiments.

According to various example embodiments, in operation 401, the external electronic device 104 (e.g., the external electronic device 104 of FIG. 2A) may transmit an advertising message to the electronic device 200.

The advertising message may be a message requesting position measurement of the electronic device 200, The advertising message may include information required to perform data exchange through first communication (e.g., information indicating whether the first external electronic device 104-*a* supports first communication, information indicating whether the first external electronic device 104-*a* has activated first communication, or identification information of the first external electronic device 104-*a*).

According to various example embodiments, the advertising message may be transmitted to the electronic device 200 through first communication or another communication method (out of band (OOB)) (e.g., second communication). According to an embodiment, the advertising message may be received through second communication, and the electronic device 200 may receive the advertising message transmitted by the second communication circuit 305.

According to various example embodiments, the electronic device 200 may identify a position of the electronic device 200 through a sensor module (e.g., the sensor module 176 of FIG. 1). In the case that the position of the electronic device 200 is a designated position, in order to receive an advertising message, the electronic device 200 may activate the second communication circuit 305, According to an embodiment, the designated position may include a position where a traffic accident is likely to occur (e.g., accident black spot, intersection, or traffic light).

According to various example embodiments, in operation 403, the electronic device 200 may receive an advertising message, and activate the first communication circuit 303 corresponding to/based on the advertising message satisfying a designated condition.

According to various example embodiments, the electronic device 200 may activate the first communication circuit 303 corresponding to a quality (e.g., RSRP and/or RSSI) of a signal including an advertising message satisfying a designated condition (e.g., a condition in which the signal quality is greater than or equal to a designated value), As another example, the electronic device 200 may maintain the first communication circuit 303 in a deactivated state corresponding to a signal quality not satisfying a designated condition.

According to various example embodiments, in operation 405, the electronic device 200 may transmit a response message to the external electronic device 104.

According to various example embodiments, a response message (e.g., BLE scan response message) may be transmitted through second communication.

According to various example embodiments, the response message may include information required to perform data exchange through first communication (e.g., information indicating whether the electronic device 200 supports first communication or information indicating whether the electronic device 200 has activated first communication). The external electronic device 104 may activate first communication corresponding to receiving the response message.

Figure 5:
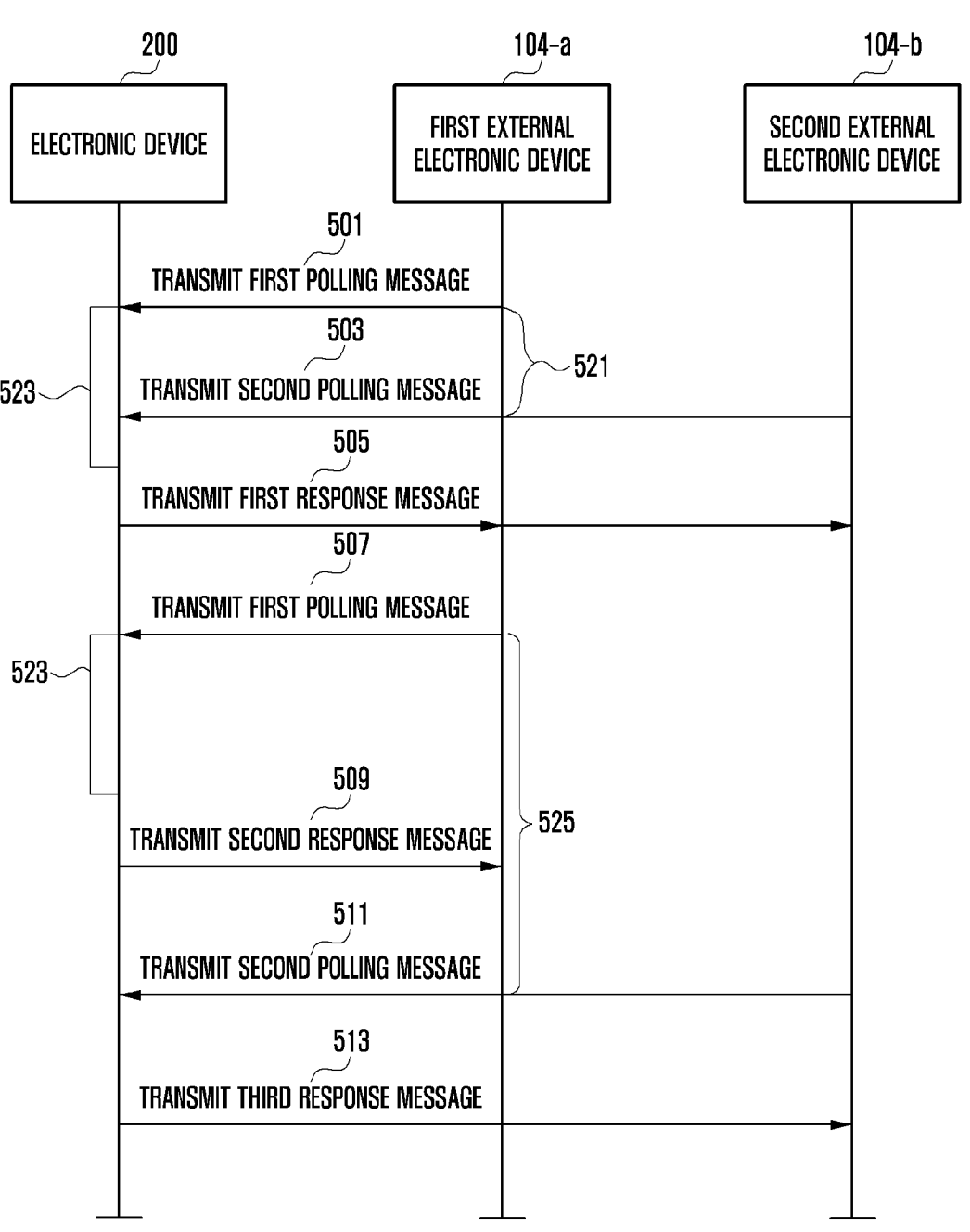
FIG. 5 is a message flow diagram illustrating an embodiment of determining a position of an electronic device according to various example embodiments.

According to various example embodiments, in operation 407, the external electronic device 104 may transmit a configuration message of first communication for activating first communication. The configuration message of the first communication may include parameters related to a channel configuration between the external electronic device 104 and the electronic device 200 through first communication, FIG. 5 is a message flow diagram illustrating an embodiment of determining a position of an electronic device according to various example embodiments.

According to various example embodiments, in operation 501, the first external electronic device (e.g., the first external electronic device 104-*a* of FIG. 2B) may transmit a first polling message to the electronic device (e.g., the electronic device 200 of FIG. 2B).

The first polling message may be a message indicating the start of ranging between the first external electronic device 104-*a* and the electronic device 200. The first external electronic device 104-*a* may store information on a time at which the first polling message was transmitted while transmitting the first polling message. According to an embodiment, the first polling message may include information on a transmission time of the first polling message.

According to various example embodiments, the electronic device 200 may maintain activation of a receiving function of a first communication circuit (e.g., the first communication circuit 303 of FIG. 3) during a designated time period 523 after receiving the first polling message from the first external electronic device 104-*a*. The receiving function of the first communication circuit 303 may indicate a receiving function of a received signal through first communication. The designated time 523 may be configured to various values by the manufacturer of the electronic device 200. For example, the designated time 523 may be 50 ms, which is half of a ranging period (e.g., 100 ms).

According to various example embodiments, the electronic device 200 may identify whether the second polling message is received from the second external electronic device 104-*b* during a designated time period 523.

According to various example embodiments, in operation 503, the second external electronic device (e.g., the second external electronic device 104-*b* of FIG. 2B) may transmit a second polling message to the electronic device 200.

The second polling message may be a message indicating the start of ranging between the second external electronic device 104-*b* and the electronic device 200. The second external electronic device 104-*b* may store information on a time at which the second polling message was transmitted while transmitting the second polling message.

According to various example embodiments, in operation 505, the electronic device 200 may broadcast (or multicast) a first response message.

According to various example embodiments, the electronic device 200 may broadcast (or multi-cast) a first response message including information (e.g., reply time) for measuring a distance between the electronic device 200 and the first external electronic device 104-*a* and information (e.g., reply time) for measuring a distance between the electronic device 200 and the second external electronic device 104-*b* corresponding to the electronic device 200 receiving (521) die second polling message within a designated time period 523.

According to various example embodiments, the first response message may include a difference (e.g., reply time) between a reception time of the first polling message transmitted by the first external electronic device 104-*a* and a transmission time of the first response message and/or a difference (e.g., reply time) between a reception time of the second polling message transmitted by the second external electronic device 104-*b* and a transmission time of the first response message.

The electronic device 200 may transmit one first response message without transmitting each of a second response message corresponding to the first polling message and a third response message corresponding to the second polling message, thereby reducing the number of transmissions of response messages. Through the above method, the electronic device 200 can reduce power consumption according to transmission of the response message.

According to various example embodiments, the first external electronic device 104-*a* may receive the first response message and determine a relative position of the electronic device 200 to the first external electronic device 104-*a* based on a reply time corresponding to the first external electronic device 104-*a* included in a reply time list in the first response message and a transmission time of the first polling message.

According to various example embodiments, the second external electronic device. 104-*b* may receive the first response message and determine a relative position of the electronic device 200 to the second external electronic device 104-*b* based on a reply time corresponding to the second external electronic device 104-*b* included in the reply time list in the first response message and a transmission time of the second polling message.

According to various example embodiments, in operation 507, the first external electronic device 104-*a* may transmit a first polling message to the electronic device 200.

According to various example embodiments, the first external electronic device 104-*a* may transmit a first polling message to the electronic device 200 in order to identify a position of the electronic device 200 every designated ranging period.

According to various example embodiments, the electronic device 200 may maintain activation of a receiving function of a first communication circuit (e.g., the first communication circuit 303 of FIG. 3) during a designated time period 523 after receiving the first polling message from the first external electronic device 104-*a*. The receiving function of the first communication circuit 303 may indicate a receiving function of a received signal through first communication. The designated/predetermined time 523 may be configured to various values by the manufacturer of the electronic device 200. For example, the designated time 523 may be 50 ms, which is half of a ranging period (e.g., 100 ms).

The electronic device 200 may identify whether the second polling message is received from the second external electronic device 104-*b* during a designated time period 523.

According to various example embodiments, in operation 509, the electronic device 200 may transmit a second response message including information (e.g., reply time) for measuring a distance between the device 200 and the first external electronic device 104-*a* to the first external electronic device 104-*a* corresponding to not receiving (525) the second polling message during a designated time period 523 after receiving the first polling message.

The second response message may include a difference (e.g., reply time) between a reception time of the first polling message transmitted by the first external electronic device 104-*a* and a transmission time of the second response message.

According to various example embodiments, in operation 511, the second external electronic device 104-*b* may transmit a second polling message to the electronic device 200.

According to various example embodiments, in operation 513, the electronic device 200 may transmit a third response message including information (e.g., reply time) for measuring a distance between the electronic device 200 and the second external electronic device 104-*b* to the second external electronic device 104-*b* corresponding to receiving the second polling message after designated time period and corresponding to receiving the second polling message.

The third response message may include a difference (e.g., reply time) between a reception e of the second polling message transmitted by the second external electronic device 104-*b* and a transmission time of the third response message.

Figure 6:
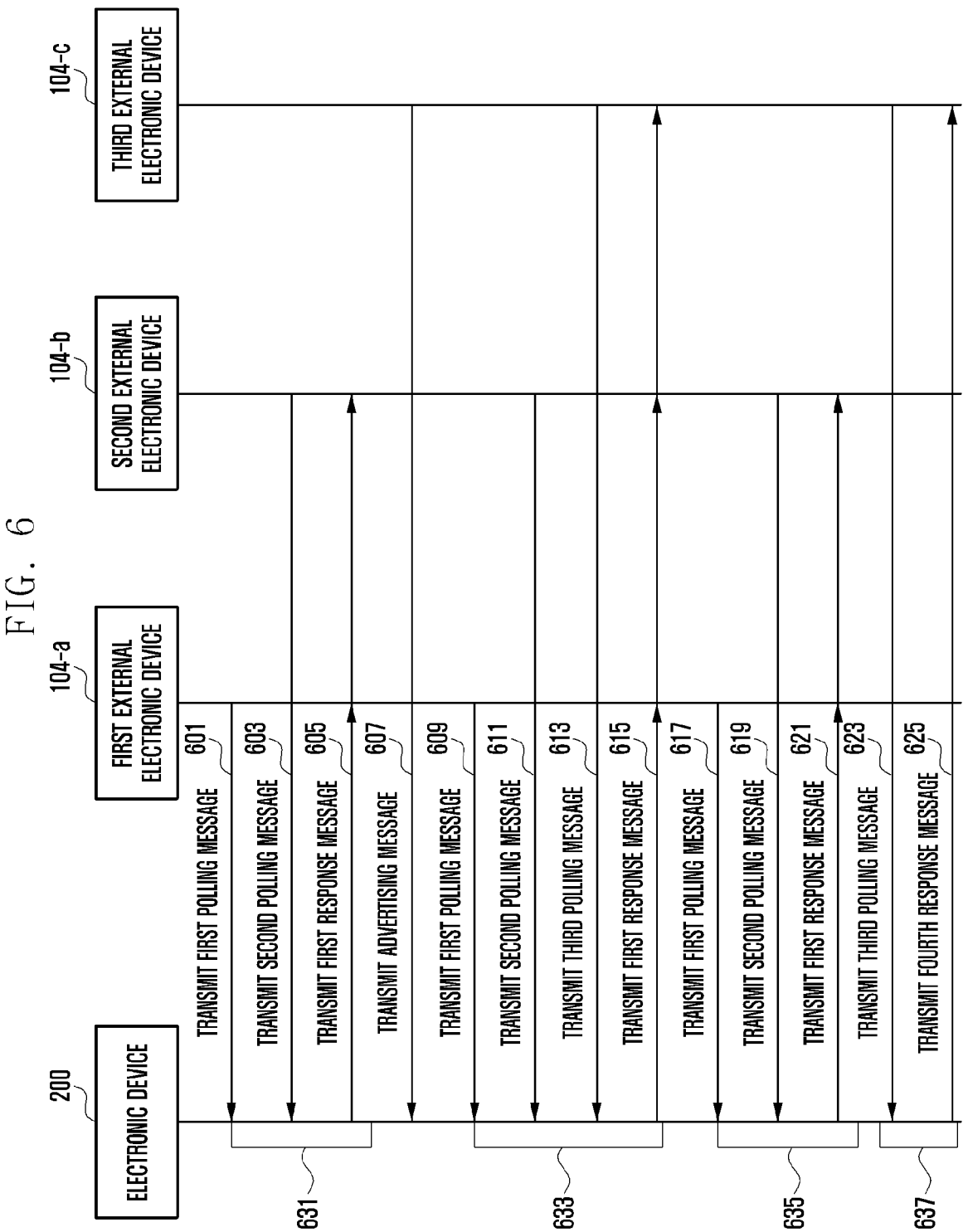
FIG. 6 is a message flow diagram illustrating an embodiment of determining a position of an electronic device according to various example embodiments.

FIG. 6 is a message flow diagram illustrating an embodiment of determining a position of an electronic device according to various example embodiments.

According to various example embodiments, in operation 601, a first external electronic device (e.g., the first external electronic device 104-*a* of FIG. 2B) may transmit a first polling message to electronic device (e.g., die electronic device 200 of FIG. 2B).

The first polling message may be a message indicating the start of ranging between the first external electronic device 104-*a* and the electronic device 200. The first external electronic device 104-*a* may store information on a time at which the first polling message was transmitted while transmitting the first polling message. According to an embodiment, the first polling message may include information on a transmission time of the first polling message.

According to various example embodiments, after receiving the first polling message from the first external electronic device 104-*a*, the electronic device 200 may maintain activation of a receiving function of a first communication circuit (e.g., the first communication circuit 303 of FIG. 3) during a designated time period 631. The receiving function of the first communication circuit 303 may indicate a receiving function of a received signal through first communication. The designated time 631 may be configured to various values by the manufacturer of the electronic device 200. For example, the designated time 631 may be 10 ms.

The electronic device 200 may identify whether a second polling message is received from the second external electronic device 104-*b* during a designated time period 631.

According to various example embodiments, in operation 603, the second external electronic device the second external electronic device 104-*b* of FIG. 2B) may transmit a second polling message to the electronic device 200.

The second polling message may be a message indicating the start of ranging between the second external electronic device 104-*b* and the electronic device 200, The second external electronic device 104-*b* may store information on a time at which the second polling message was transmitted while transmitting the second polling message.

According to various example embodiments, in operation 605, the electronic device 200 may broadcast (or multicast) a first response message.

According to various example embodiments, the electronic device 200 may broadcast (or multi-cast) a first response message including information (e.g., reply time) for measuring a distance between the electronic device 200 and the first external electronic device 104-*a* and information (e.g., reply time) for measuring a distance between the electronic device 200 and the second external electronic device 104-*b* corresponding to receiving the second polling message within a designated time period 631.

According to various example embodiments, the electronic device 200 may temporarily deactivate a receiving function of the first communication circuit 303 after broadcasting the first response message. The electronic device 200 may periodically activate the receiving function of the first communication circuit 303 based on an earlier time of a reception time of the first polling message and a reception time of the second polling message.

According to various example embodiments, in operation 607, the third external electronic device 104-*c* may transmit an advertising message to the electronic device 200 through second communication.

According to various example embodiments, while the electronic device 200 performs a ranging operation with the first external electronic device 104-*a* and/or the second external electronic device 104-*b*, the electronic device 200 may receive an advertising message for position measurement of the electronic device 200 from the third external electronic device 104-*c*. The electronic device 200 may control the first communication circuit 303 to connect the third external electronic device 104-*c* to the electronic device 200 through first communication corresponding to the advertising message satisfying a designated condition.

According to various example embodiments, the electronic device 200 may receive a third polling message corresponding to receiving an advertising message for the first time from the third external electronic device 104-*c*, and maintain a receiving function of the first communication circuit 303 until a response message corresponding to the third polling message is transmitted (633).

According to various example embodiments, in operation 609, the first external electronic device 104-*a* may transmit a first polling message to the electronic device 200.

According to various example embodiments, in operation 611, the second external electronic device 104-*b* may transmit a second polling message to the electronic device 200.

According to various example embodiments, the electronic device 200 may not transmit a response message until a third polling message is received to the third external electronic device 104-*c* according to reception of the first polling message and/or the second polling message.

According to various example embodiments, in operation 613, the third external electronic device 104-*c* may transmit a third polling message to the electronic device 200.

The third polling message may be a message indicating the start of ranging. While transmitting the third polling message, the third external electronic device 104-*c* may store information on a time at which the third polling message was transmitted.

According to various example embodiments, in operation 615, the electronic device 200 may transmit (or multicast) a first response message including information (e.g., reply time) for measuring a distance between the electronic device 200 and the first external electronic device 104-*a*, information (e.g., reply time) for measuring a distance between the electronic device 200 and the second external electronic device 104-*b*, and/or information (e.g., reply time) for measuring a distance between the electronic device 200 and the third external electronic device 104-*c* through the first communication circuit 303.

According to various example embodiments, the first response message may include a difference (e.g., reply time) between a reception time of a first polling message transmitted by the first external electronic device 104-*a* and a transmission time of the first response message, a difference (e.g., reply time) between a reception time of a second polling message transmitted by the second external electronic device 104-*b* and a transmission time of the first response message, and/or a difference (e.g., reply time) between a reception time of a third polling message transmitted by the third external electronic device 104-*c* and a transmission time of the first response message.

According to various example embodiments, the electronic device 200 may temporarily deactivate a receiving function of the first communication circuit 303 after broadcasting the first response message. The electronic device 200 may periodically activate the receiving function of the first communication circuit 303 based on an artier time of a reception time of the first polling message, a reception time of the second polling message, and/or a reception time: of the third polling message.

According to various example embodiments, in operation 617, the first external electronic device 104-*a* may transmit a first polling message to the electronic device 200.

According to various example embodiments, after receiving the first polling message from the first external electronic device 104-a, the electronic device 200 may maintain activation of a receiving function of a first communication circuit (e.g., the first communication circuit 303 of FIG. 3) during a designated time period 635. The receiving function of the first communication circuit 303 may indicate a receiving function of a received signal through first communication. The designated time 635 may be configured to various values by the manufacturer of the electronic device 200. For example, the designated time 631 may be 10 ms.

The electronic device 200 may identify whether the second polling message is received from the second external electronic device 104-b during a designated period 635.

According to various example embodiments, in operation 619, the second external electronic device 104-b may transmit a second polling message to the electronic device 200.

According to various example embodiments, in operation 621, the electronic device 200 may broadcast (or multicast) a first response message through the first communication circuit 303.

The electronic device 200 may broadcast (or multicast) a first response message including information (e.g., reply time) for measuring a distance between the electronic device 200 and the first external electronic device 104-a and information (e.g., reply ti for measuring a distance bet ween the electronic device 200 and the second external electronic device 104-b corresponding to receiving the second polling message within the designated time 635.

According to various example embodiments, the electronic device 200 may temporarily deactivate a receiving function of the first communication circuit 303 after broadcasting first response message. The electronic device 200 may periodically activate a receiving function of the first communication circuit 303 in order to receive the third polling message based on a reception time of the third polling message (operation 613).

According to various example embodiments, in operation 623, the third external electronic device 104-c may transmit a third polling message to the electronic device 200.

According to various example embodiments, in operation 625, the electronic device 200 may transmit a fourth response message to the third external electronic device 104-c.

According to various example embodiments, the electronic device 200 may stand by reception of another polling message during a designated time period 637 corresponding to receiving the third polling message. The electronic device 200 may transmit a fourth response message corresponding to the third polling message to the third external electronic device 104-c corresponding to not receiving another polling message during a designated time period 637.

The electronic device 200 may broadcast a first response message including information for measuring a distance between at least one external electronic device that has transmitted the polling message and the electronic device 200 corresponding to receiving another polling message (e.g., the first polling message or the second polling message) during a designated time period 637.

Figure 7:
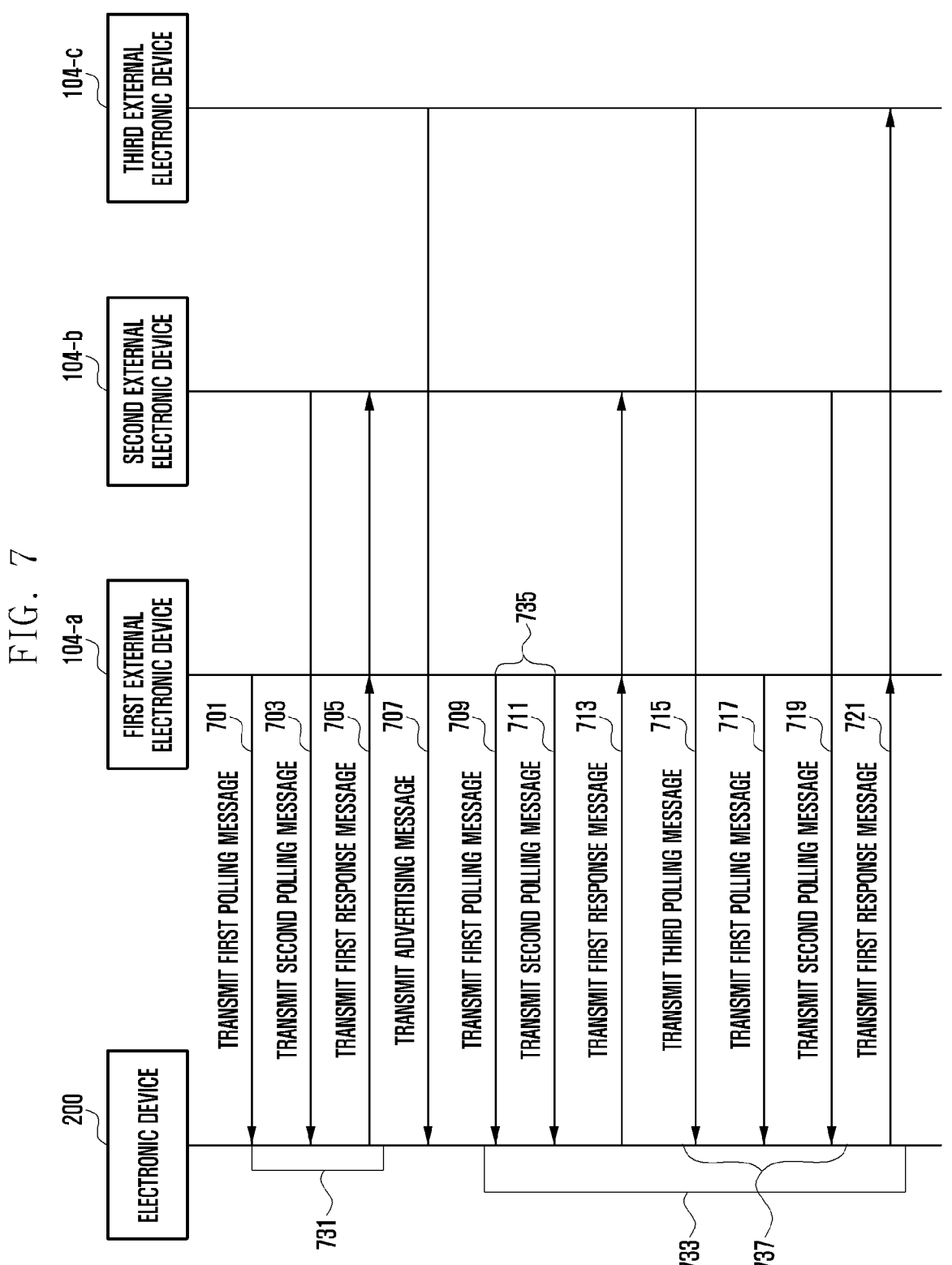
FIG. 7 is a message flow diagram illustrating an embodiment of determining a position of an electronic device according to various example embodiments.

FIG. 7 is a message flow diagram illustrating an embodiment of determining a position of an electronic device according to various example embodiments.

According to various example embodiments, in operation 701, a first external electronic device (e.g., the first external electronic device 104-a of FIG. 2B) may transmit a first polling message to the electronic device (e.g., the electronic device 200 of FIG. 2B).

The first polling message may be a message indicating the start of ranging between the first external electronic device 104-a and the electronic device 200. The first external electronic device 104-a may store information on a time at which the first polling message was transmitted while transmitting the first polling message. According to an embodiment, the first polling message may include information on a transmission time of the first polling message.

According to various example embodiments, after receiving the first polling message from the first external electronic device 104-a, the electronic device 200 may maintain activation of a receiving function of a first communication circuit (e.g., the first communication circuit 303 of FIG. 3) during a designated time period 731. The receiving function of the first communication circuit 303 may indicate a receiving function of a received signal through first communication. The designated time 731 may be configured to various values by the manufacturer of the electronic device 200. For example, the designated time 731 may be 10 ms.

The electronic device 200 may identify whether the second polling message is received from the second external electronic device 104-b during a designated time period 731.

According to various example embodiments, in operation 703, the second external electronic device (e.g., the second external electronic device 104-b of FIG. 2B) may transmit a second polling message to the electronic device 200.

The second polling message may be a message indicating the start of ranging between the second external electronic device 104-b and the electronic device 200. The second external electronic device 104-b may store information on a time at which the second polling message was transmitted while transmitting the second polling message.

According to various example embodiments, in operation 705, the electronic device 200 may broadcast (or multicast) a first response message. The electronic device 200 may broadcast (or multicast) a first response message including information (e.g., reply time) for measuring a distance between the electronic device 200 and the first external electronic device 104-a and information (e.g., reply time) for measuring a distance between the electronic device 200 and the second external electronic device 104-b corresponding to receiving a second polling message within the designated time 731.

According to various example embodiments, the electronic device 200 may temporarily deactivate a receiving function of the first communication circuit 303 after broadcasting the first response message. The electronic device 200 may periodically activate a receiving function of the first communication circuit 303 based on an earlier time of a reception time of the first polling message and a reception time of the second polling message.

According to various example embodiments, in operation 707, the third external electronic device 104-c may transmit an advertising message to the electronic device 200 through second communication.

According to various example embodiments, while the electronic device 200 performs a ranging operation with the first external electronic device 104-a and/or the second external electronic device 104-b, the electronic device 200 may receive an advertising message for position measurement of the electronic device 200 from the third external electronic device 104-c. The electronic device 200 may control the first communication circuit 303 to connect the third external electronic device 104-c to the electronic device 200 through first communication corresponding to the advertising message satisfying a designated condition.

According to various example embodiments, the electronic device 200 may receive a third polling message corresponding to receiving an advertising message for the first time from the third external electronic device 104-*c*, and maintain a receiving function of the first communication circuit 303 until a response message corresponding to the third polling message is transmitted (733). According to another embodiment, the electronic device 200 may maintain a receiving function of the first communication circuit 303 in order to receive a third polling message during a designated time period (e.g., 2 seconds) corresponding to receiving an advertising message for the first time from the third external electronic device 104-*c*.

According to various example embodiments, in operation 709, the first external electronic device 104-*a* may transmit a first polling message to the electronic device 200.

The electronic device 200 may identify whether a second polling message is received from the second external electronic device 104-*b* and/or whether a third polling message is received from the third external electronic device 104-*c* during a designated time period 735.

According to various example embodiments, in operation TH, the second external electronic device 104-*b* may transmit a second polling message to the electronic device 200.

According to various example embodiments, in operation 713, the electronic device 200 may broadcast a first response message.

The electronic device 200 may transmit a response message including information for position measurement between the first external electronic device 104-*a* and the electronic device 200 and information for position measurement between the second external electronic device 104-*b* and the electronic device 200 corresponding to identifying that the second polling message is received from the second external electronic device 104-*b* during a designated time period 735.

The first response message may include information (e.g., reply time) for measuring a distance between the electronic device 200 and the first external electronic device 104-*a* and information (e.g., reply time) for measuring a distance between the electronic device 200 and the second external electronic device 104-*b*.

After transmitting the first response message, until the electronic device 200 receives a third polling message from the third external electronic device 104-*c* and transmits the response message (733), the electronic device 200 may maintain a receiving function of the first communication circuit 303 in an activated state.

According to various example embodiments, in operation 715, the third external electronic device 104-*c* may transmit a third polling message to the electronic device 200.

After receiving the third polling message, the electronic device 200 may stand by reception of another polling message during a designated time period 737.

According to various example embodiments, in operation 717, the first external electronic device 104-*a* may transmit a first polling message to the electronic device 200.

According to various example embodiments, in operation 719, the second external electronic device 104-*b* may transmit a second polling message to the electronic device 200.

The electronic device 200 may generate a first response message including information (e.g., reply time) for measuring a distance between the electronic device 200 and the first external electronic device 104-*a*, information (e.g., reply time) for measuring a distance between the electronic device 200 and the second external electronic device 104-*b*, and/or information (e.g., reply time) for measuring a distance between the electronic device 200 and the third external electronic device 104-*c* corresponding to receiving the first polling message, the second polling message, and/or the third polling message during a designated time period 737.

According to various example embodiments, in operation 721, the electronic device. 200 may transmit (or multi-cast) a first response message including information (e.g., reply time) for measuring a distance between the electronic device 200 and the first external electronic device 104-*a*, information (e.g., reply time) for measuring a distance between the electronic device 200 and the second external electronic device 104-*b*, anchor information (e.g., reply time) for measuring a distance between the electronic device 200 and the third external electronic device 104-*c*.

Figure 8A:
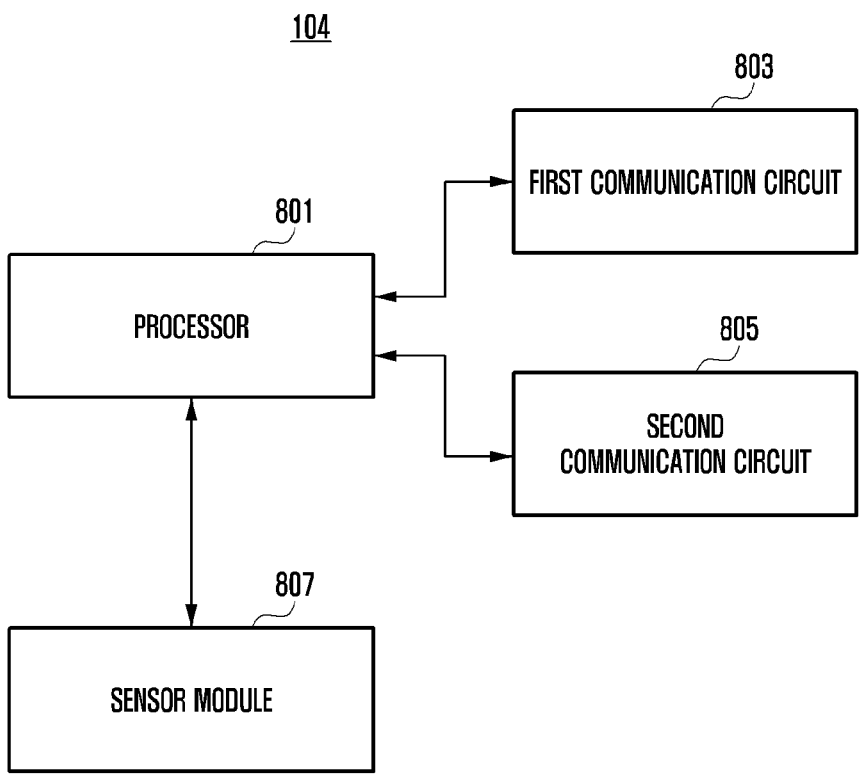
FIG. 8A is a block diagram illustrating an external electronic device according to various example embodiments.

FIG. 8A is a block diagram illustrating an external electronic device according to various example embodiments.

An external electronic device (e.g., the external electronic device 104 of FIG. 2A) according to various example embodiments may include a processor 801 (e.g., the processor 120 of FIG. 1), a first communication circuit 803 (e.g., the communication module 190 of FIG. 1, comprising communication circuitry), a second communication circuit 805 (e.g., the communication module 190 of FIG. 1, comprising communication circuitry), and/or a sensor module 807.

According to various example embodiments, the external electronic device 104 may be various electronic devices capable of communicating with the electronic device (e.g., the electronic device 200 of FIG. 2). According to an embodiment, the external electronic device 104 may be a means of transportation capable of communicating with the electronic device 200 or various infrastructures (e.g., traffic lights) related to traffic signals.

According to various example embodiments, the first communication circuit 803 may be electrically connected, directly or indirectly, to the processor 801 and transfer a signal through the first communication and received through an antenna (not illustrated) to the processor 801. The first communication circuit 803 may be electrically connected to the antenna and transmit a signal including data to be transmitted through first communication to the antenna. The first communication may include ultra wideband (hereinafter, UWB) communication. The UWB may indicate various communication methods of transmitting information using a eider frequency band (e.g., a frequency band of 3.1 GHz to 10 GHz band) than that of other communication methods.

According to various example embodiments, the second communication circuit 805 may be electrically connected to the processor 801, receive a signal through second communication, and transfer the signal to the processor 801. The second communication circuit 805 may be electrically connected to the antenna and transmit a signal including data to be transmitted through second communication to the antenna. The second communication is various communication methods supporting device-to-device (D2D) communication and the second communication may be, for example, a short-distance wireless communication method (e.g., Bluetooth, BLE, or Wi-Fi).

According to various example embodiments, the processor 801 may include at least one processor of a communication processor (e.g., the auxiliary processor 123 of FIG. 1) or an application processor (e.g., the main processor LI of FIG. 1). In order to determine a position of the electronic device 200, the processor 801 may control the first communication circuit 803 to transmit or receive data through first communication.

According to various example embodiments, the processor 801 may receive information collected by the sensor module 807 (e.g., the sensor module 176 of FIG. 1) of the external electronic device 104 and determine whether to perform an operation of determining a position of the electronic device 200 based on the received information. In an embodiment, the sensor module 807 may include a sensor capable of identifying a moving direction of the external electronic device 104 and/or a camera sensor capable of acquiring an image including the periphery of the external electronic device 104.

According to an embodiment, in the case that the external electronic device 104 is a means of transportation, the external electronic device 104 may determine to perform an operation of identifying the position of the electronic device 200 in the case that collected information satisfies a designated condition based on driving information and/or information collected through the sensor module 807, which comprises at least one sensor. The designated condition may indicate a condition in which there is a possibility of collision between the electronic device 200 and the external electronic device 104.

According to an embodiment, the external electronic device 104 tray identify a position of the external electronic device 104 through the sensor module 807. The external electronic device 104 may determine to perform an operation of identifying a position if the electronic device 200 in the case that the position of the external electronic device 104 is a designated position. According to an embodiment, the designated position may include a position where a traffic accident is likely to occur (e.g., accident black spot, intersection, or traffic light). A specific embodiment in which the external electronic device 104 determines whether a designated condition is satisfied will be described later with reference to FIG. 8B.

According to various example embodiments, the processor 801 may control the second communication circuit 805 to transmit an advertising message as part of an operation of identifying the position of the electronic device 200.

The advertising message may be a message requesting position measurement of the electronic device 200. The advertising message may include information required to perform data exchange through first communication (e.g., information indicating whether the external electronic device 104 supports first communication, information indicating whether the external electronic device 104 has activated first communication, or identification information of the external electronic device 104).

According to various example embodiments, the processor 801 may adjust a transmission period of an advertising message. The processor 801 may adjust the transmission period of the advertising message according to a speed of the external electronic device 104. For example, as the speed of the external electronic device 104 increases, the processor 801 may decrease the transmission period of the advertising message.

According to various example embodiments, the processor 801 may activate the first communication circuit 803 in order to activate first communication corresponding to receiving a response message corresponding to the advertising message through the second communication circuit 805.

According to various example embodiments, the processor 801 may control the first communication circuit 803 to activate first communication based on a parameter exchanged with the electronic device 200 and to transmit a polling message to the electronic device 200.

The polling message may be a message indicating the start of ranging. The processor 801 may store information on a time at which the polling message was transmitted while transmitting the polling message. The polling message may be implemented, as illustrated in Table 3.

TABLE 3

| Parameter | Size (bits) | Description |
|---|---|---|
| Vendor OUI | 24 | Identification information of the manufacturer of the external electronic device 104 |
| UWB Message ID | 4 | Identification information indicating the type of polling message |
| Whether an alert message exists | 1 | 0: does not exist 1: exists |
| Alert message list | 16*N | Address N of the electronic device that should receive alert messages: The number of electronic devices to receive alert messages |

According to various example embodiments, the processor 801 may receive a response message corresponding to the polling message from the electronic device 200. The response message may include a difference between a time at which the polling message is received and a time at which the response message is transmitted. The processor 801 may calculate and identify a position of the electronic device 200 based on a difference value, a time at which the polling message is transmitted, and/or a time at which the response message is received.

According to various example embodiments, the processor 801 may transmit a polling message, receive a response message, and identify a position of the electronic device 200 every determined period (e.g., ranging period).

According to various example embodiments, the processor 801 may identify whether the position of the electronic device 200 satisfies a designated condition. The designated condition may be or include a condition in which the external electronic device 104 and the electronic device 200 may collide. For example, in the case that a distance between the external electronic device 104 and the electronic device 200 is less than or equal to a designated value, the processor 801 may determine that a designated condition is satisfied.

According to various example embodiments, the processor 801 may predict a moving path of the electronic device 200 based on measured positions of the electronic device 200, and determine whether the electronic device 200 and the external electronic device 104 will collide based on the predicted moving path.

According to various example embodiments, the processor 801 may control the first communication circuit 803 to transmit a polling message including an alert message requesting the eternal electronic device 104 to output a notification to the electronic device 200 corresponding to the position of the electronic device 200 satisfying a designated condition.

According to various example embodiments, upon receiving the polling message, the electronic device 200 may identify whether the polling message includes an alert message. Upon receiving the polling message including the alert message, the electronic device 200 may output a notification using various methods (e.g., vibration or sound output).

Figure 8B:
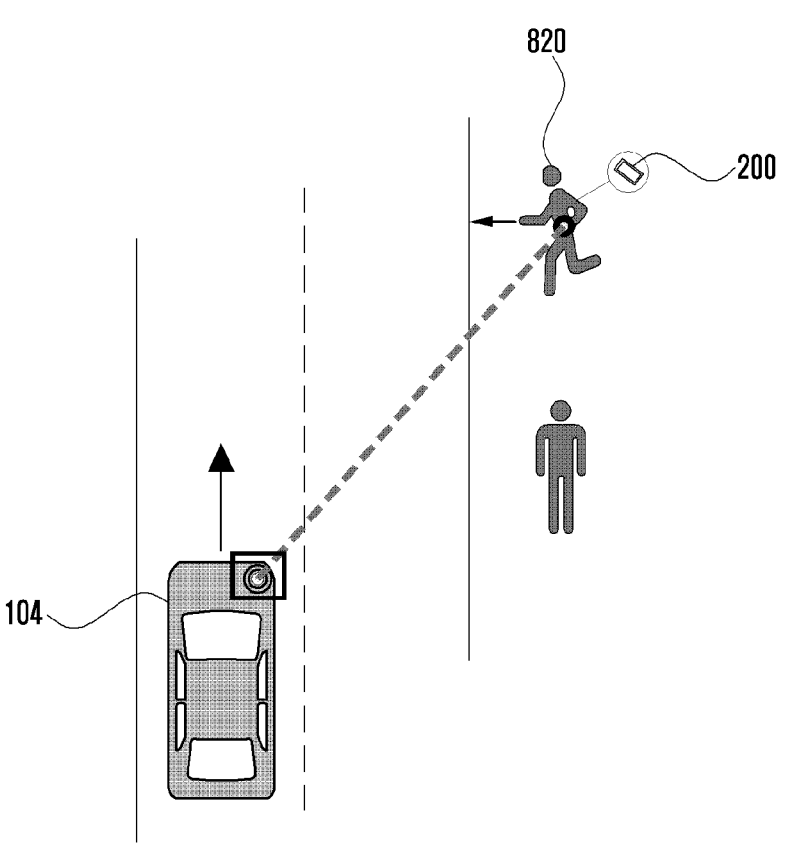
FIGS. 8B, 8C, and 8D are diagrams illustrating an embodiment in which an external electronic device identifies a position of an electronic device 200 using information collected through a sensor module (e.g., a sensor module 807 of FIG. 8A) according to various example embodiments.
Figure 8C:
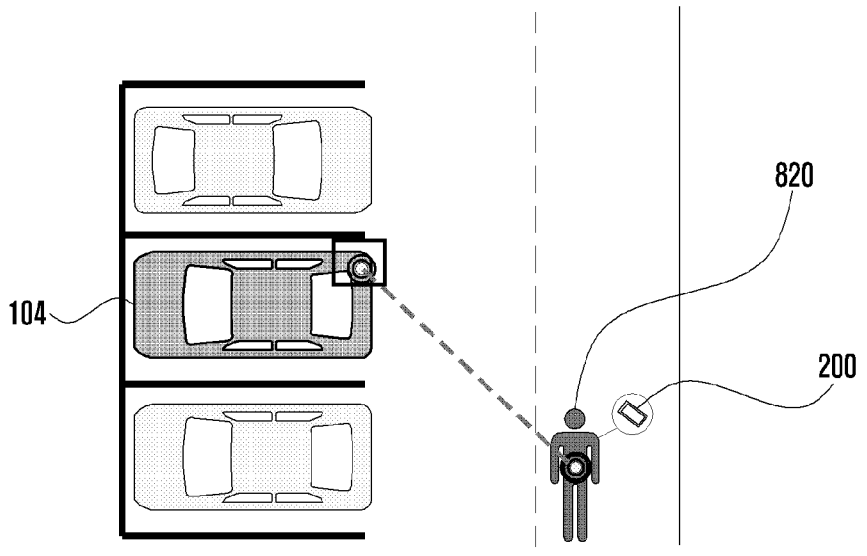
Figure 8D:
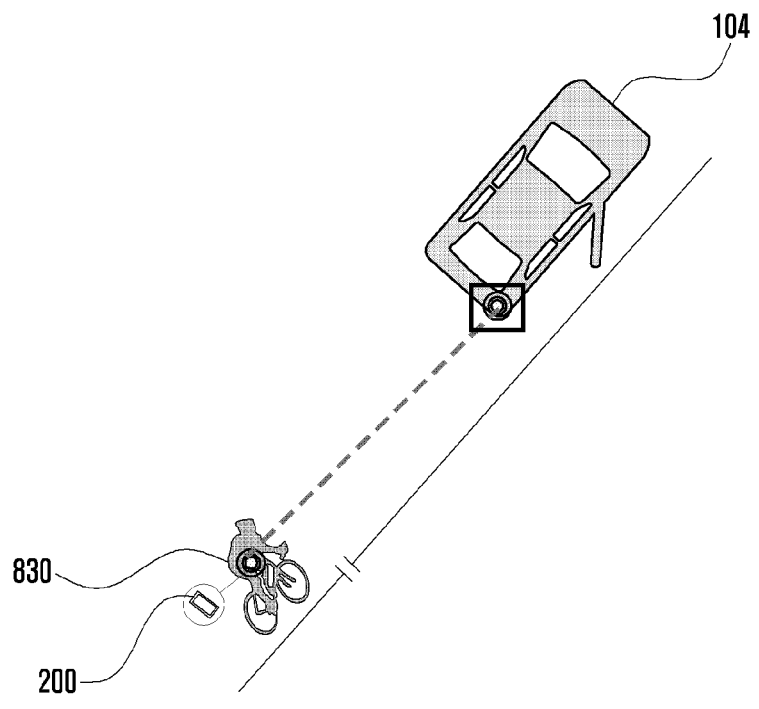

FIGS. 8B, 8C, and 8D are diagrams illustrating an embodiment in which an external electronic device identifies a position of an electronic device 200 using information collected through a sensor module (e.g., the sensor module 807 of FIG. 8A) according to various example embodiments.

With reference to FIG. 8B, the external electronic device 104 may detect a pedestrian 820 existing in a periphery of the external electronic device 104 through the sensor module 807 disposed at the front thereof. The external electronic device 104 may identify a movement of the pedestrian 820 through the sensor module 807 and determine that a designated condition is satisfied corresponding to identifying that a moving direction of the pedestrian 820 is a direction approaching the external electronic device 104. The external electronic device 104 may perform an operation of identifying a position of the electronic device 200 corresponding to the pedestrian 820 according to satisfaction of the designated condition. The external electronic device 104 may control the first communication circuit (e.g., the first communication circuit 803 of FIG. 8A) to transmit a polling message including an alert message requesting an output of a notification to the electronic device 200 corresponding to the position of the electronic device 200 satisfying a designated condition. As another example, the external electronic device 104 may perform an operation such as slowing down, stopping, or Outputting a notification corresponding to the position of the electronic device 200 satisfying a designated condition.

With reference to FIG. 8C, the external electronic device 104 may detect a pedestrian 820 existing in a periphery of the external electronic device 104 through the sensor module 807 disposed at the rear (or rear side) thereof. The external electronic device 104 may identify a movement of the pedestrian 820 through the sensor module 807 and determine that a designated condition is satisfied corresponding to identifying that a moving direction of the pedestrian 820 is a direction approaching the external electronic device 104. The external electronic device 104 may perform an operation of identifying a position of the electronic device 200 corresponding to the pedestrian 820 according to satisfaction of the designated condition. The external electronic device 104 control the first communication circuit (e.g., the first communication circuit 803 of FIG. 8A) to transmit a polling message including an alert message requesting the external electronic device 104 to output a notification to the electronic device 200 corresponding to the position of the electronic device 200 satisfying a designated condition.

With reference to FIG. 8D, the external electronic device 104 may detect a driver 830 driving a bicycle existing in a periphery thereof through the sensor module 807 disposed at the rear (or rear side) thereof. The external electronic device 104 may identify a movement of the driver 830 through the sensor module 807 and determine that a designated condition is satisfied corresponding to identifying that a moving direction of the driver 830 is a direction approaching the external electronic device 104. The external electronic device 104 may perform an operation of identifying a position of the electronic device 200 corresponding to the driver 830 according to satisfaction of the designated condition. The external electronic device 104 may control the first communication circuit (e.g., the first communication circuit 803 of FIG. 8A) to transmit a polling message including an alert message requesting the external electronic device 104 to output a notification to the electronic device 200 corresponding to the position of the electronic device 200 satisfying a designated condition.

Figure 9:
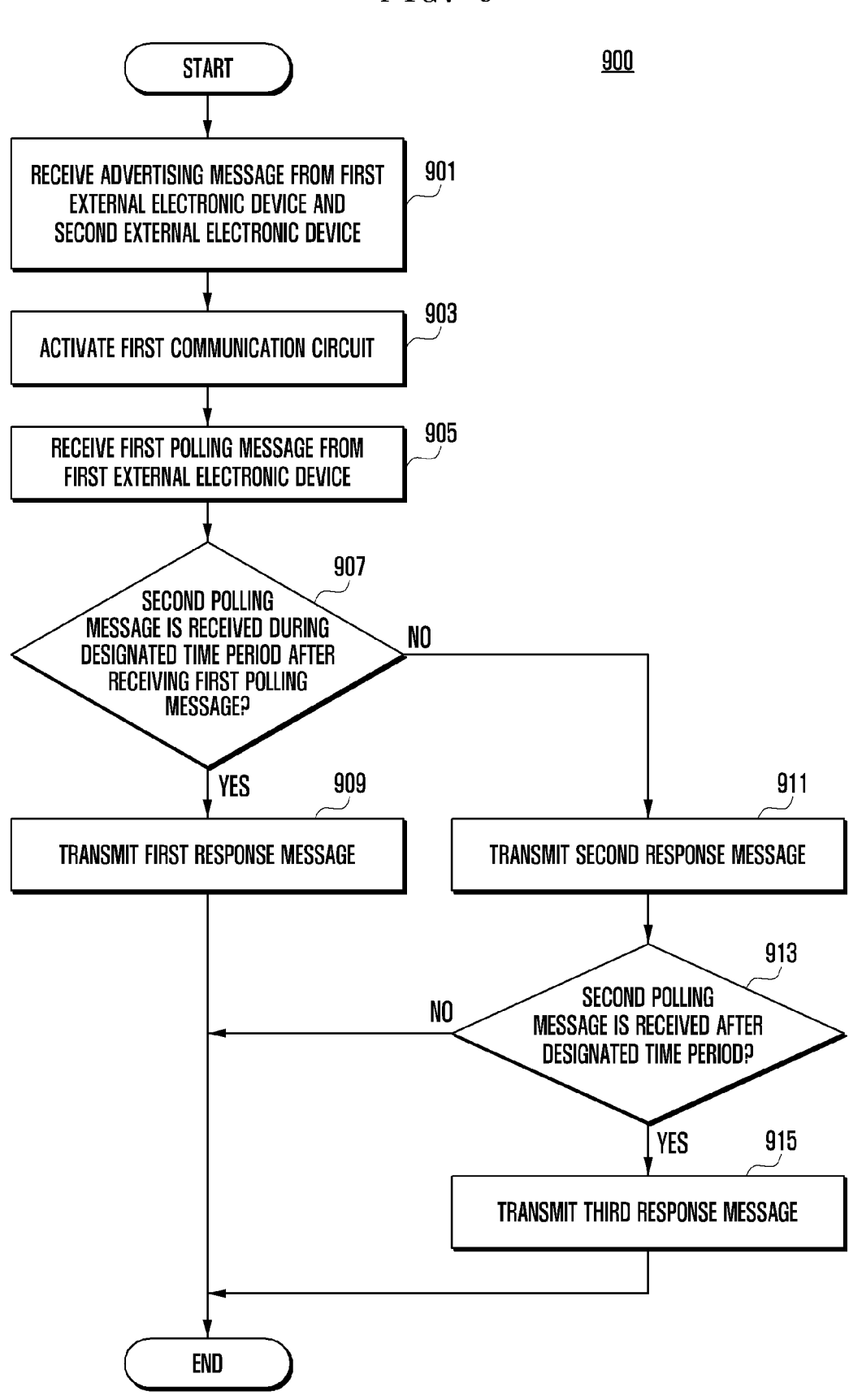
FIG. 9 is a flowchart illustrating a method of operating an electronic device according to various example embodiments.

FIG. 9 is a flowchart illustrating a method 900 of operating an electronic device according to various example embodiments.

According to various example embodiments, in operation 901, the electronic device (e.g., the electronic device 200 of FIG. 2A) may receive an advertising message from a first external electronic device (e.g., the first external electronic device 104-a of FIG. 2B) and/or a second external electronic device (e.g., the second external electronic device 104-b of FIG. 2B).

According to various example embodiments, the electronic device 200 may receive an advertising message transmitted by the first external electronic device 104-a. The advertising message may be a message requesting position measurement of the electronic device 200. The advertising message may include information required to perform data exchange through first communication (e.g., information indicating whether the first external electronic device 104-a supports first communication, information indicating whether the first external electronic device 104-a has activated first communication, or identification information of the first external electronic device 104-a).

According to various example embodiments, the electronic device 200 may receive an advertising message from the second external electronic device 104-b. The advertising message may be a message requesting position measurement of the electronic device 200. The advertising message may include information required to perform data exchange through first communication (e.g., information indicating whether the second external electronic device 104-b supports first communication, information indicating whether the second external electronic device 104-b has activated first communication, or identification information of the second external electronic device 104-b).

According to various example embodiments, the electronic device 200 may receive an advertising message transmitted by the first external electronic device 104-a and/or the second external electronic device 104-b and transmit a response message (e.g., BLE SCAN response message) to the advertising message to the first external electronic device 104-a and/or the second external electronic device 104-b.

According to various example embodiments, the electronic device 200 may transmit a response message to the first external electronic device 104-a and/or the second external electronic device 104-b through second communication corresponding to the advertising message satisfying a designated condition. The electronic device 200 may transmit a response message to the first external electronic device 104-a and/or the second external electronic device 104-b corresponding to a quality (e.g., RSRP and/or RSSI) of a signal including the advertising message satisfying a designated condition (e.g., a condition in which the signal quality is greater than or equal to a designated value). The response message may include information required to perform data exchange through first communication (e.g., information indicating whether the electronic device 200 supports first communication, information indicating whether the electronic device 200 has activated first communication, or identification information of the electronic device 200).

According to various example embodiments, in operation 903, the electronic device 200 may activate a first communication circuit (e.g., the first communication circuit 303 of FIG. 3) corresponding to the advertising message satisfying a designated condition.

According to various example embodiments, the electronic device 200 may receive an advertising message and activate the first communication circuit 303 corresponding to the advertising message satisfying a designated condition. The electronic device. 200 may activate the first communication circuit 303 corresponding to a quality (e.g., RSRP and/or RSSI) of a signal including the advertising message satisfying a designated condition (e.g., a condition in which the signal quality is greater than or equal to a designated value).

According to various example embodiments, while the first external electronic device. 104-*a* and/or the second external electronic device 104-*b* transmit(s) and receive(s) various messages through first communication, the first external electronic device 104-*a* and/or the second external electronic device 104-*b* may individually perform ranging (e.g., two-way ranging) for determining a position of the electronic device 200.

According to various example embodiments, in operation 905, the electronic device 200 may receive a first polling message from the first external electronic device 104-*a*.

According to various example embodiments, the electronic device 200 may receive a first polling message from the first external electronic device 104-*a*. The first polling message may be a message indicating the start of ranging. The first external electronic device 104-*a* may store information on a time at which the first polling message was transmitted while transmitting the first polling message. According to an embodiment, the first polling message may include information on a transmission time of the first polling message.

According to various example embodiments, after receiving the first polling message from the first external electronic device 104-*a*, the electronic device 200 may maintain activation of a receiving function of the first communication circuit 303 during a designated time period. The receiving function of the first communication circuit 303 may indicate a receiving function of a received signal through first communication. The designated time may be configured to various values by a manufacturer of the electronic device 200. For example, the designated time may be 50 ms, which is half of a ranging period (e.g., 100 ms).

According to various example embodiments, in operation 907, after receiving the first polling message, the electronic device 200 may identify whether a second polling message is received during a designated time period.

The second polling message may be a message indicating the start of ranging. The second external electronic device 104-*b* may store information on a time at which the second polling message was transmitted while transmitting the second polling message.

According to various example embodiments, in operation 909, the electronic device 200 may transmit a first response message to the first external electronic device 104-*a* and/or the second external electronic device 104-*b* corresponding to rec (operation 907—YES) a second polling message during a designated time period after receiving the first polling message.

The electronic device 200 may broadcast (or multi-cast) a first response message including information (e.g., reply time) for measuring a distance between the electronic device 200 and the first external electronic device 104-*a* and information (e.g., reply time) for measuring a distance between the electronic device 200 and the second external electronic device 104-*b* corresponding to receiving the second polling message within a designated time period after receiving the first polling message.

The first response message may include a difference (e.g., reply time) between a reception time of the first polling message transmitted by the first external electronic device 104-*a* and a transmission of the first response message and/or a difference (e.g., reply time) between a reception time of the second polling message transmitted by the second external electronic device 104-*b* and a transmission time of the first response message.

According to various example embodiments, the first external electronic device 104-*a* may receive the first response message, and determine a relative position of the electronic device 200 to the first external electronic device 104-*a* based on a reply time corresponding to the first external electronic device 104-*a* included in a reply time list in the first response message and a transmission time of the first polling message.

According to various example embodiments, the second external electronic device. 104-*b* may receive the first response message and determine a relative position of the electronic device 200 to the second external electronic device 104-*b* based on a reply time corresponding to the second external electronic device 104-*b* included in the reply time list in the first response message and a transmission time of the second polling message.

According to various example embodiments, in operation 911, the electronic device 200 may transmit a second response message to the first external electronic device 104-*a* corresponding to not receiving (operation 907-NO) the second polling message during a designated time period after receiving the first polling message.

According to various example embodiments, the electronic device 200 may transmit a second response message including information (e.g., reply time) for measuring a distance between the electronic device 200 and the first external electronic device 104-*a* to the first external electronic device 104-*a*. The second response message may include a difference (e.g., reply time) between a reception time of the first polling message transmitted by the first external electronic device 104-*a* and a transmission time of the second response message.

According to various example embodiments, in operation 913, the electronic device 200 may identify whether a second polling message is received after designated time period after receiving the first polling message.

According to various example embodiments, in operation 915, the electronic device 200 may transmit a third response message corresponding to receiving (operation 913—YES) a second polling message after designated time period after receiving the first polling message.

The third response message may include a difference (e.g., reply time) between a reception time of the second polling message transmitted by the second external electronic device 104-*b* and a transmission time of the third response message.

According to various example embodiments, in the END operation in FIG. 9, the electronic device 200 may terminate the operation corresponding to not receiving (operation 913-NO) the second polling message after designated time period after receiving the first polling message.

Figure 10:
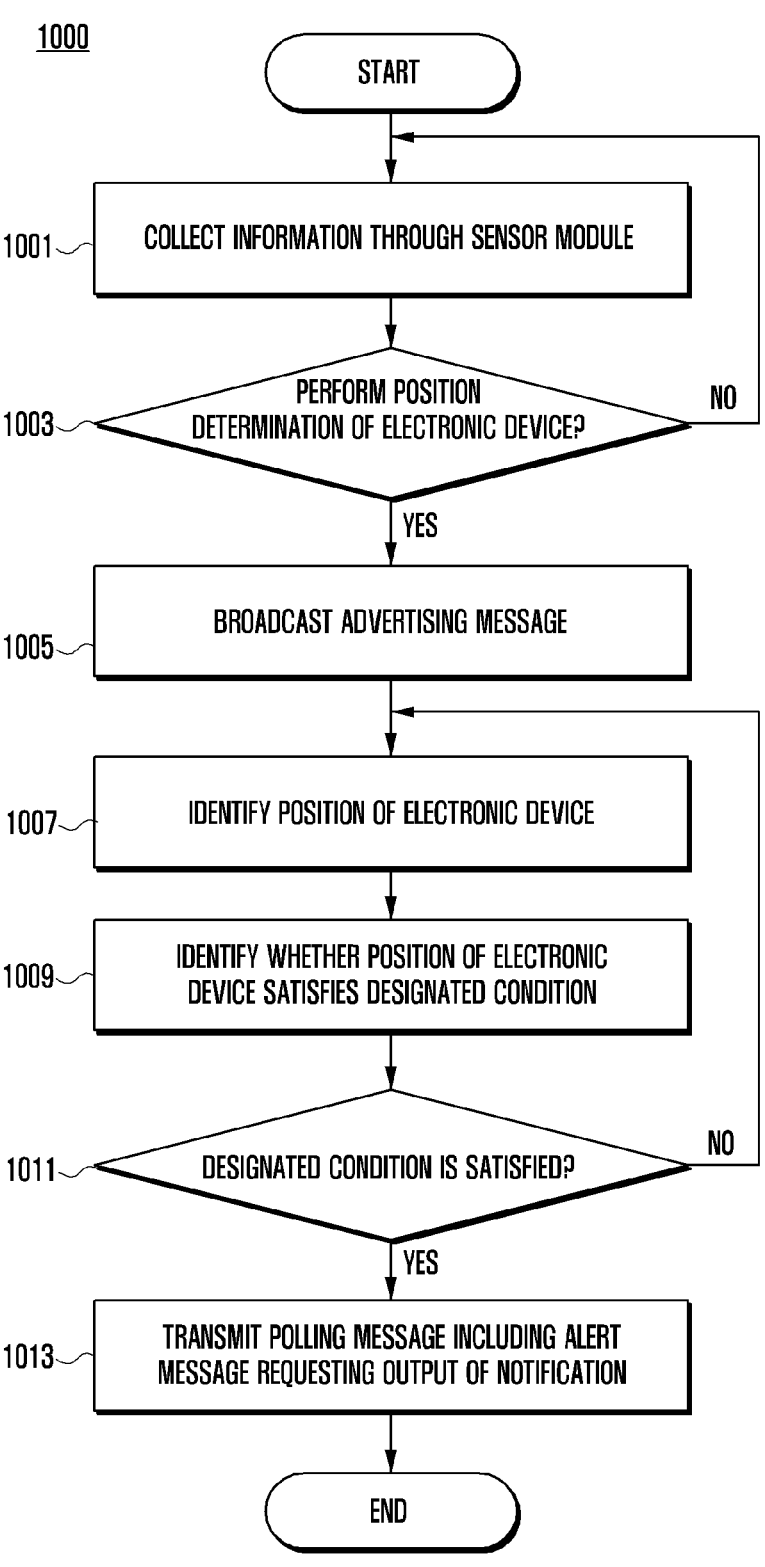
FIG. 10 is a flowchart illustrating a method of operating an external electronic device according to various example embodiments.

FIG. 10 is a flowchart illustrating a method 1000 of operating an external electronic device according to various example embodiments.

According to various example embodiments, in operation 1001, an external electronic device (e.g., the external electronic device 104 of FIG. 2A) may collect information through a sensor module (e.g., the sensor module 807 of FIG. 8).

For example, the sensor module 807 may include a sensor capable of identifying a moving direction of the external electronic device 104, a sensor capable of identifying a position of the external electronic device 104, a sensor capable of identifying an external object existing in a periphery of the external electronic device 104, and/or a camera sensor capable of acquiring an image including a periphery of the external electronic device 104.

According to various example embodiments, in operation 1003, the external electronic device 104 may determine whether to perform an operation of determining a position of the electronic device 200.

According to an embodiment, in the case that the external electronic device 104 is a means of transportation, and in the case that collected information satisfies a designated condition based on driving information and/or information collected through the sensor module 807, the external electronic device 104 may determine to perform an operation of identifying the position of the electronic device 200. For example, the designated condition may be or include a condition in which there is a possibility of collision between the electronic device 200 and the external electronic device 104.

According to various example embodiments, in operation 1005, the external electronic device 104 may broadcast an advertising message corresponding to determining (operation 1003—YES) to perform an operation of determining a position of the electronic device 200.

The advertising message may be a message requesting position measurement of the electronic device 200. The advertising message may include information required to perform data exchange through first communication (e.g., information indicating whether the external electronic device 104 supports first communication, information indicating whether the external electronic device 104 has activated first communication, or identification information of the external electronic device 104).

According to various example embodiments, the external electronic device 104 may perform a series of operations of activating first communication corresponding to receiving a response message corresponding to the advertising message through the second communication circuit 805, and determining a position of the electronic device 200 through first communication.

According to various example embodiments, the external electronic device 104 may transmit a polling message to the electronic device 200. The polling message may be a message indicating the start of ranging. The external electronic device 104 may store information on a time at which the polling message was transmitted while transmitting the polling message.

According to various example embodiments, in operation 1007, the external electronic device 104 may identify a position of the electronic device 200.

According to various example embodiments, the external electronic device 104 may receive a response message corresponding to the polling message from the electronic device 200. The response message may include a difference between a time at which the polling message is received and a time at which the response message is transmitted. The external electronic device 104 may calculate and identify a position of the electronic device 200 based on a difference value, the time at which the polling message was transmitted, and/or the time at which the response message was received.

According to various example embodiments, the external electronic device 104 may transmit a polling message, receive a response message, and identify a position of the electronic device 200 every determined period (e.g., ranging period).

According to various example embodiments, in operation 1009, the external electronic device 104 may identify whether the position of the electronic device 200 satisfies a designated condition.

The designated condition may indicate a condition in which the external electronic device 104 and the electronic device 200 may collide. For example, in the case that a distance between the external electronic device 104 and the electronic device 200 is less than or equal to a designated value, the external electronic device 104 rimy determine that a designated condition is satisfied.

According to various example embodiments, the external electronic device 104 may identify the position of the electronic device 200 every designated period corresponding to the position of the electronic device 200 not satisfying the designated condition (operation 1011-NO).

According to various example embodiments, in operation 1013, the external electronic device 104 may transmit a polling message including an alert message requesting an output of a notification to the electronic device 200 corresponding to the position of the electronic device 200 satisfying a designated condition (operation 1011—YES).

According to various example embodiments, upon receiving the polling message, the electronic device 200 may identify whether the polling message includes an alert message. Upon receiving the polling message including the alert message, the electronic device 200 may output a notification using various methods (e.g., vibration or sound output).

An electronic device according to various example embodiments may include a first communication circuit (e.g., the first communication circuit 303 of FIG. 3) configured to perform data transmission or reception through first communication using an ultra wide band (UWB); a second communication circuit (e.g., the second communication circuit 305 of FIG. 3) configured to perform data transmission or reception through second communication different from first communication; and a processor (e.g., the processor 301 of FIG. 3), wherein the processor 301 may be configured to receive an advertising message requesting position measurement of the electronic device 200 from a first external electronic device (e.g., the first external electronic device 104-*a* of FIG. 2B) and a second external electronic device (e.g., the second external electronic device 104-*b* of FIG. 2B) through the second communication circuit 305, to activate the first communication circuit 303 corresponding to the advertising message satisfying a designated condition, to receive a first polling message for position measurement of the electronic device from the first external electronic device 104-*a*, to identify whether a second polling message for position measurement of the electronic device 200 is received from the second external electronic device 104-*b* during a designated time period from a reception time of the first polling message, and to broadcast a first response message including information for measuring a distance between the electronic device 200 and the first external electronic device 104-*a* and information for measuring a distance between the electronic device 200 and the second external electronic device 104-*b* corresponding to reception of the second polling message.

In the electronic device according to various example embodiments, the first response message may include a reply time corresponding to the first polling message and a reply time corresponding to the second polling message.

In the electronic device according to various example embodiments, the processor 301 may be configured to transmit a second response message including information for measuring a distance between the electronic device 200 and the first external electronic device 104-*a* corresponding to identifying that the second polling message is not received during a designated time period from a reception time of the first polling message, and to broadcast a third response message including information for measuring a distance between the electronic device 200 and the second external electronic device 104-*b* corresponding to receiving the second polling message after the designated time period from a reception time of the first polling message.

In the electronic device according to various example embodiments, the second response message may include a reply time corresponding to the first polling message, and the third response message may include a reply time corresponding to the second polling message.

In the electronic device according to various example embodiments, the processor 301 may be configured to receive an advertising message requesting position measurement of the electronic device 200 through first communication transmitted by a third external electronic device (e.g., the third external electronic device 104-*c* of FIG. 213), and to control the first communication circuit 303 to maintain a receiving function of the first communication circuit 303 in an activated state until a third polling message for position measurement of the electronic device 200 is received from the third external electronic device 104-*c*.

In the electronic device according to various example embodiments, the processor 301 may be configured to determine whether to maintain an activated state of a receiving function of the first communication circuit 303 configured to receive the third polling message based on a transmission time of the third polling message included in the third polling message.

In the electronic device according to various example embodiments, the processor 301 may be configured to control a receiving function of the first communication circuit 303 based on a transmission time of the first polling message included in the first polling message and a transmission time of the second polling message included in the second polling message.

In the electronic device according to various example embodiments, the processor 301 may be configured to transmit the first response message and then deactivate a receiving function of the first communication circuit 303, and to determine a time point of activating a receiving function of the first communication circuit based on an earlier time of the transmission time of the first polling message and the transmission time of the second polling message.

In the electronic device according to various example embodiments, the processor 301 may be configured to identify whether a polling message transmitted by the first external electronic device 104-*a* and/or the second external electronic device 104-*b* includes a message requesting an output of a notification, and to output the notification based on information included in a message requesting an output of the notification, and the message requesting an output of the notification may be generated based on relative position information between the electronic device 200 and the first external electronic device 104-*a* and/or relative position information between the electronic device 200 and the second external electronic device 104-*b*.

A method of operating an electronic device according to various example embodiments may include receiving an advertising message requesting position measurement of the electronic device 200 from a first external electronic device 104-*a* and a second external electronic device 104-*b*; activating a first communication circuit 303 configured to perform first communication corresponding to the advertising message satisfying a designated condition; receiving a first polling message for position measurement of the electronic device 200 from the first external electronic device 104-*a*; identifying whether a second polling message for position measurement of the electronic device 200 is received from the second external electronic device 104-*b* during a designated time period from a reception time of the first polling message; and broadcasting a first response message including information for measuring a distance between the electronic device 200 and the first external electronic device 104-*a* and information for measuring a distance between the electronic device 200 and the second external electronic device 104-*b* corresponding to reception of the second polling message.

In the method of operating an electronic device according to various example embodiments, the first response message may include a reply time corresponding to the first polling message and a reply time corresponding to the second polling message.

A method of operating an electronic device according to various example embodiments may further include transmitting a second response message including information for measuring a distance between the electronic device 200 and the first external electronic device 104-*a* corresponding to identifying that the second polling message is not received during a designated time period from a reception time of the first polling message; or transmitting a third response message including information for measuring a distance between the electronic device 200 and the second external electronic device 104-*b* corresponding to receiving the second polling message after the designated time period from a reception time of the first polling message.

In the method of operating an electronic device according to various example embodiments, the second response message may include a reply time corresponding to the first polling message, and the third response message may include a reply time corresponding to the second polling message.

A method of operating an electronic device according to various example embodiments may further include receiving an advertising message requesting position measurement of the electronic device 200 through first communication transmitted by a third external electronic device; and maintaining a receiving function of the first communication circuit in an activated state until a third polling message for position measurement of the electronic device 200 is received from the third external electronic device.

A method of operating an electronic device according to various example embodiments may further include determining whether to maintain an activated state of a receiving function of the first communication circuit configured to receive the third polling message based on a transmission time of the third polling message included in the third polling message.

A method of operating an electronic device according to various example embodiments may further include controlling a receiving function of the first communication circuit 303 based on a transmission time of the first polling message included in the first polling message and a transmission time of the second polling message included in the second polling message.

A method of operating an electronic device according to various example embodiments may further include deactivating a receiving function of the first communication circuit 303 after transmitting the first response message and determining a time point of activating a receiving function of the first communication circuit 303 based on an earlier time of a transmission time the first polling message, and a transmission time of the second polling message.

A method of operating an electronic device according to various example embodiments may further include identifying whether a polling message transmitted by the first external electronic device 104-*a* and/or the second external electronic device 104-*b* includes a message requesting an output of a notification; and outputting the notification based on information included in the message requesting an output of the notification, wherein the message requesting an output of the notification may be generated based on relative position information between the electronic device 200 and the first external electronic device 104-*a* and/or relative position information between the electronic device 200 and the second external electronic device 104-*b*.

An electronic device (e.g., the external electronic device 104 of FIG. 8A) according to various example embodiments may include a first communication circuit (e.g., the first communication circuit 803 of FIG. 8A) configured to perform data transmission or reception through first communication using an ultra wide band (UWB); a second communication circuit (e.g., the second communication circuit 805 of FIG. 8A) configured to perform data transmission or reception through second communication different from first communication; and a processor (e.g., the processor 801 of FIG. 8A), wherein the processor 801 may be configured to broadcast an advertising message requesting position measurement of an external electronic device (e.g., the electronic device 200 of FIG. 2A) through the second communication, to activate the first communication circuit 803 corresponding to receiving a response message corresponding to the advertising message from the external electronic device 104, to control the first communication circuit 803 to transmit a polling message for position measurement of the electronic device 200, to identify a relative position between the external electronic device 104 and the electronic device 200 based on a response message received through the second communication circuit 805, and to enable the external electronic device 104 to transmit a polling message including a request message requesting to output a notification corresponding to the relative position between the external electronic device 104 and the electronic device 200 satisfying a designated condition.

The electronic device according to various example embodiments may further include a sensor module (e.g., the sensor module 807 of FIG. 8A, comprising at least one sensor), and the processor 801 may be configured to activate the second communication circuit 805 based on that information collected by the sensor module 807 satisfies a designated condition related to a position of the electronic device 200 and/or the external electronic device 104. "Based on" as used herein covers based at least on.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s).

As used in connection with various example embodiments, the term. "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device, comprising:
a first communication circuit configured to perform at least one of data transmission or reception via first communication using an ultra wide band (UWB);
a second communication circuit configured to perform at least one of data transmission or reception via second communication different from first communication; and
a processor, comprising processing circuitry, configured to:
receive a first advertising message requesting position measurement of the electronic device from a first external electronic device and a second external electronic device via the second communication circuit,
activate the first communication circuit based on the first advertising message satisfying a condition,
receive a first polling message for position measurement of the electronic device from the first external electronic device,
identify whether a second polling message for position measurement of the electronic device is received from the second external electronic device during a designated time period from a reception time of the first polling message, and
broadcast a first response message, including information for measuring a distance between the electronic device and the first external electronic device and information for measuring a distance between the electronic device and the second external electronic device, based on reception of the second polling message.

2. The electronic device of claim 1, wherein the first response message comprises a reply time corresponding to the first polling message and a reply time corresponding to the second polling message.

3. The electronic device of claim 1, wherein the processor is configured to:
control to transmit a second response message including information for measuring a distance between the electronic device and the first external electronic device based on identifying that the second polling message is not received during a designated time period from a reception time of the first polling message, and
control to broadcast a third response message including information for measuring a distance between the electronic device and the second external electronic device based on receiving a second polling message after the designated time period from the reception time of the first polling message.

4. The electronic device of claim 3, wherein the second response message comprises a reply time corresponding to the first polling message, and
the third response message comprises a reply time corresponding to the second polling message.

5. The electronic device of claim 1, wherein the processor is configured to:
receive a second advertising message requesting position measurement of the electronic device via the first communication, from a third external electronic device, and
control the first communication circuit to maintain a receiving function of the first communication circuit in an activated state at least until a third polling message for position measurement of the electronic device is received from the third external electronic device.

6. The electronic device of claim 5, wherein the processor is configured to determine whether to maintain an activated state of the receiving function of the first communication circuit configured to receive the third polling message based on a transmission time of the third polling message included in the third polling message.

7. The electronic device of claim 1, wherein the processor is configured to control a receiving function of the first communication circuit based on a transmission time of the first polling message included in the first polling message and a transmission time of the second polling message included in the second polling message.

8. The electronic device of claim 7, wherein the processor is configured to:
control to transmit the first response message and then deactivate the receiving function of the first communication circuit, and
determine a time point of activating a receiving function of the first communication circuit based on an earlier time of the transmission time of the first polling message and the transmission time of the second polling message.

9. The electronic device of claim 1, wherein the processor is configured to:
identify whether the first polling message and the second polling message comprises a message requesting an output of a notification, and
control to output the notification based on information included in the message requesting the output of the notification, and
the message requesting the output of the notification is based on relative position information between the electronic device and the first external electronic device and/or relative position information between the electronic device and the second external electronic device.

10. A method of operating an electronic device, the method comprising:

receiving a first advertising message requesting position measurement of the electronic device from a first external electronic device and a second external electronic device;

activating a first communication circuit configured to perform first communication based on the advertising message satisfying a condition;

receiving a first polling message for position measurement of the electronic device from the first external electronic device;

identifying whether a second polling message for position measurement of the electronic device is received from the second external electronic device during a designated time period from a reception time of the first polling message; and broadcasting a first response message, including information for measuring a distance between the electronic device and the first external electronic device and information for measuring a distance between the electronic device and the second external electronic device, based on reception of the second polling message.

11. The method of claim 10, wherein the first response message comprises a reply time corresponding to the first polling message and a reply time corresponding to the second polling message.

12. The method of claim 10, further comprising:

transmitting a second response message including information for measuring a distance between the electronic device and the first external electronic device based on identifying that the second polling message is not received during a designated time period from a reception time of the first polling message; and/or transmitting a third response message including information for measuring a distance between the electronic device and the second external electronic device based on receiving the second polling message after the designated time from a reception time of the first polling message.

13. The method of claim 12, wherein the second response message comprises a reply time corresponding to the first polling message, and the third response message comprises a reply time corresponding to the second polling message.

14. The method of claim 10, further comprising:

receiving a second advertising message requesting position measurement of the electronic device through the first communication from a third external electronic device; and maintaining a receiving function of the first communication circuit in an activated state at least until a third polling message for position measurement of the electronic device is received from the third external electronic device.

15. The method of claim 14, further comprising determining whether to maintain an activated state of the receiving function of the first communication circuit configured to receive the third polling message based on a transmission time of the third polling message included in the third polling message.

* * * * *